US009218152B2

(12) United States Patent
Hamano et al.

(10) Patent No.: US 9,218,152 B2
(45) Date of Patent: Dec. 22, 2015

(54) IMAGE FORMING APPARATUS AND CONTROL METHOD THEREOF

(71) Applicant: CANON KABUSHIKI KAISHA, Tokyo (JP)

(72) Inventors: Shigemichi Hamano, Abiko (JP); Mitsuhiko Sato, Kashiwa (JP); Tadaaki Saida, Kashiwa (JP); Hiroto Nishihara, Toride (JP); Takahiko Yamaoka, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/686,526

(22) Filed: Nov. 27, 2012

(65) Prior Publication Data
US 2013/0163032 A1 Jun. 27, 2013

(30) Foreign Application Priority Data
Dec. 26, 2011 (JP) ................................. 2011-284461

(51) Int. Cl.
G06F 3/12 (2006.01)
G06F 11/07 (2006.01)
B41B 1/00 (2006.01)
H04B 1/74 (2006.01)

(52) U.S. Cl.
CPC ............ *G06F 3/1296* (2013.01); *G06F 11/076* (2013.01); *G06F 11/0733* (2013.01)

(58) Field of Classification Search
CPC ........... H04N 2201/0094; G03G 15/55; G06F 3/1296; G06F 11/0733; G06F 11/076
See application file for complete search history.

(56) References Cited

U.S. PATENT DOCUMENTS

| 4,755,747 | A | 7/1988 | Sato |
| 5,305,193 | A | 4/1994 | Shinnaka et al. |
| 5,604,928 | A | 2/1997 | Hamano et al. |
| 5,752,040 | A | 5/1998 | Kaneko et al. |
| 6,166,505 | A | 12/2000 | Sato |
| 6,963,698 | B2 | 11/2005 | Kondo |
| 6,975,753 | B2 | 12/2005 | Matsuura et al. |
| 7,391,979 | B2 | 6/2008 | Yamaguchi et al. |

(Continued)

FOREIGN PATENT DOCUMENTS

| JP | 2001-034126 A | 2/2001 |
| JP | 2002-297389 A | 10/2002 |
| JP | 2005-219247 A | 8/2005 |

(Continued)

*Primary Examiner* — Marivelisse Santiago Cordero
*Assistant Examiner* — Daryl Jackson
(74) *Attorney, Agent, or Firm* — Fitzpatrick, Cella, Harper & Scinto

(57) ABSTRACT

An image forming apparatus comprises: a detection unit which detects the abnormal condition of the image forming apparatus; a storage unit which stores, as history information, information about a type of the abnormal condition and an occurrence situation of the abnormal condition in a case where the detection unit detects the abnormal condition; a determination unit which determines whether an occurrence frequency of the abnormal condition which has newly occurred is higher than a predetermined frequency; and a notification unit which, in a case where an abnormal condition has newly occurred and the determination unit determines that the occurrence frequency of the abnormal condition which has newly occurred is higher than the predetermined frequency, stops the image forming apparatus and notifies the user of trouble information for making a repair request by the user.

5 Claims, 20 Drawing Sheets

(56) References Cited

U.S. PATENT DOCUMENTS

| | | |
|---|---|---|
| 7,721,730 B2 | 5/2010 | Hamano et al. |
| 2003/0105995 A1* | 6/2003 | Schroath et al. ............... 714/48 |
| 2006/0158518 A1* | 7/2006 | Sakai ........................ 348/207.2 |
| 2009/0009803 A1* | 1/2009 | Takeuchi et al. ............ 358/1.15 |
| 2009/0132589 A1* | 5/2009 | Daos et al. ................. 707/104.1 |
| 2009/0219572 A1* | 9/2009 | Iwata ........................... 358/1.15 |

FOREIGN PATENT DOCUMENTS

| | | |
|---|---|---|
| JP | 2010-188529 A | 9/2010 |
| JP | 2011-062942 A | 3/2011 |
| JP | 2011-131536 A | 7/2011 |

* cited by examiner

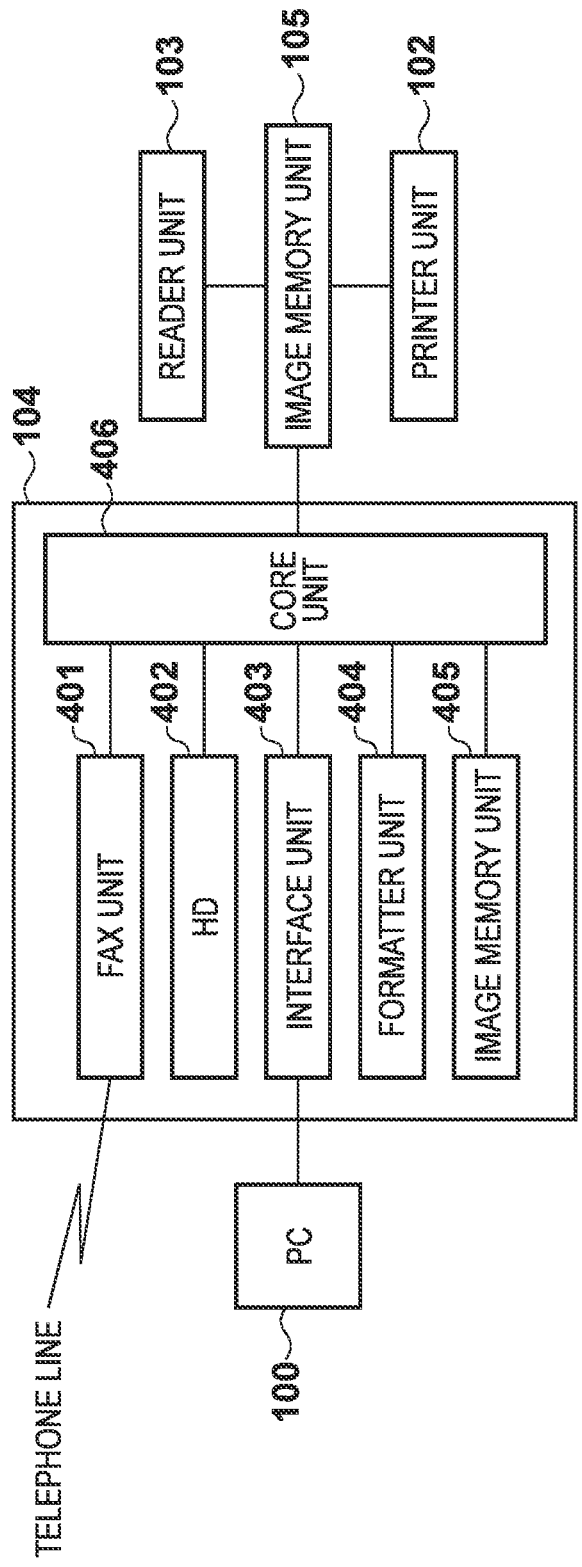

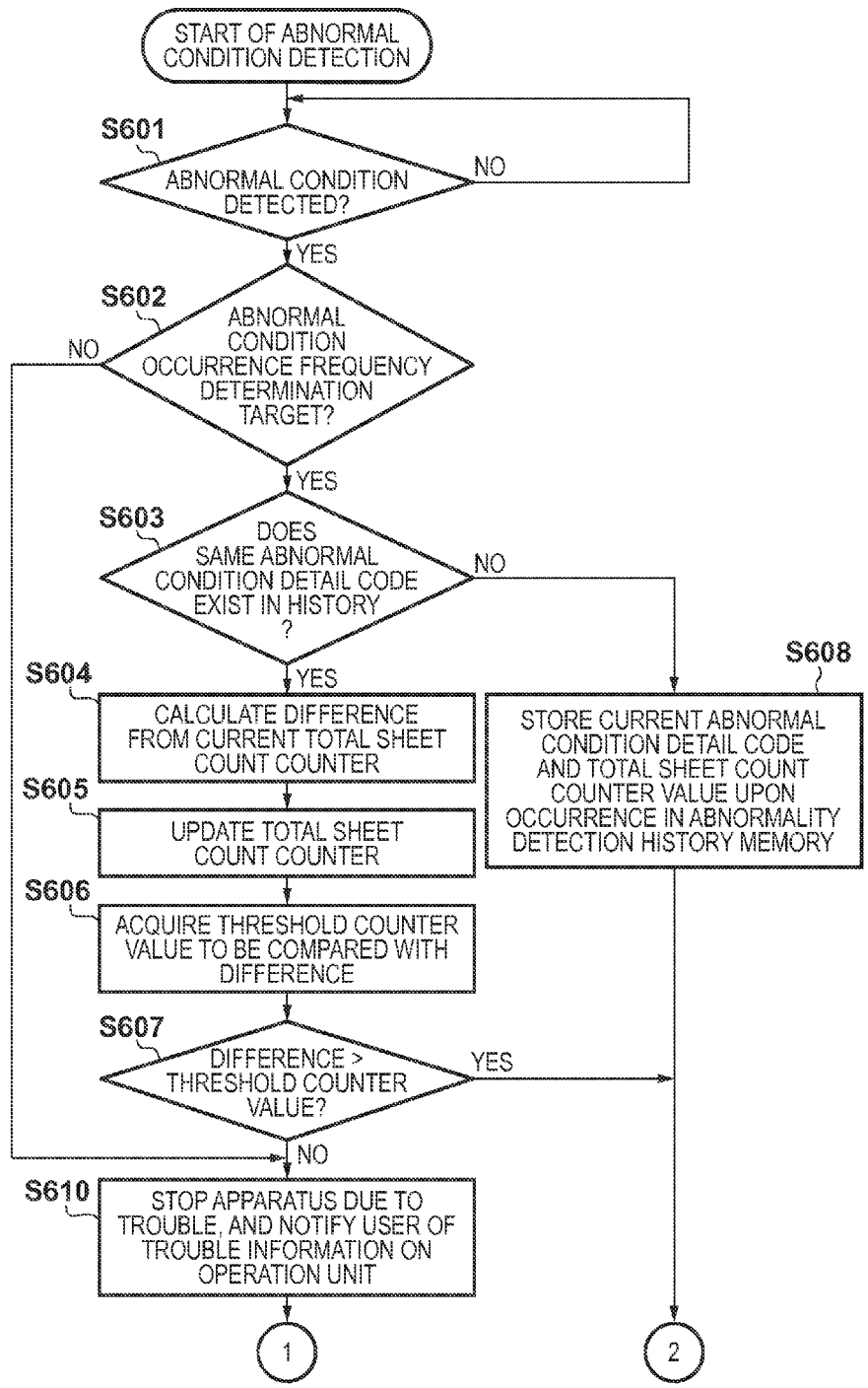

F I G. 7A

| ABNORMALITY DETECTION HISTORY MEMORY ADDRESS | ABNORMAL CONDITION DETAIL CODE | TOTAL SHEET COUNT COUNTER VALUE UPON OCCURRENCE OF ABNORMAL CONDITION | ANOTHER ADDITIONAL INFORMATION 1 | ANOTHER ADDITIONAL INFORMATION 2 |
|---|---|---|---|---|
| 00000001 | 00010044 | 00001304 | 00000000 | 00000000 |
| 00000002 | 00040022 | 00001504 | 00000000 | 00000000 |
| 00000003 | 00020033 | 00001550 | 00000000 | 00000000 |
| 00000004 | 00070011 | 00004550 | 00000000 | 00000000 |
| 00000005 | 00080011 | 00006804 | 00000000 | 00000000 |

7001  7002

F I G. 7B

| ABNORMALITY DETECTION HISTORY MEMORY ADDRESS | ABNORMAL CONDITION DETAIL CODE | TOTAL SHEET COUNT COUNTER VALUE UPON OCCURRENCE OF ABNORMAL CONDITION | ANOTHER ADDITIONAL INFORMATION 1 | ANOTHER ADDITIONAL INFORMATION 2 |
|---|---|---|---|---|
| 00000001 | 00010044 | 00001304 | 00000000 | 00000000 |
| 00000002 | 00040022 | 00001504 | 00000000 | 00000000 |
| 00000003 | 00020033 | 00001550 | 00000000 | 00000000 |
| 00000004 | 00070011 | 00004550 | 00000000 | 00000000 |
| 00000005 | 00080011 | 00007000 | 00000000 | 00000000 |

F I G. 7C

| ABNORMALITY DETECTION HISTORY MEMORY ADDRESS | ABNORMAL CONDITION DETAIL CODE | TOTAL SHEET COUNT COUNTER VALUE UPON OCCURRENCE OF ABNORMAL CONDITION | ANOTHER ADDITIONAL INFORMATION 1 | ANOTHER ADDITIONAL INFORMATION 2 |
|---|---|---|---|---|
| 00000001 | 00010044 | 00001304 | 00000000 | 00000000 |
| 00000002 | 00040022 | 00001504 | 00000000 | 00000000 |
| 00000003 | 00020033 | 00001550 | 00000000 | 00000000 |
| 00000004 | 00070011 | 00004550 | 00000000 | 00000000 |
| 00000005 | 00080011 | 00010500 | 00000000 | 00000000 |

F I G. 7D

| ABNORMALITY DETECTION HISTORY MEMORY ADDRESS | ABNORMAL CONDITION DETAIL CODE | TOTAL SHEET COUNT COUNTER VALUE UPON OCCURRENCE OF ABNORMAL CONDITION | ANOTHER ADDITIONAL INFORMATION 1 | ANOTHER ADDITIONAL INFORMATION 2 |
|---|---|---|---|---|
| 00000001 | 00110022 | 00013005 | 00000000 | 00000000 |
| 00000002 | 00040022 | 00001504 | 00000000 | 00000000 |
| 00000003 | 00020033 | 00001550 | 00000000 | 00000000 |
| 00000004 | 00070011 | 00004550 | 00000000 | 00000000 |
| 00000005 | 00080011 | 00010500 | 00000000 | 00000000 |

FIG. 8

| ABNORMAL CONDITION DETAIL CODE | ABNORMAL CONDITION OCCURRENCE FREQUENCY DETERMINATION THRESHOLD COUNTER VALUE |
|---|---|
| 0001 | 00002000 |
| 0002 | 00002000 |
| 0003 | 00002000 |
| 0004 | 00002000 |
| ⋮ | ⋮ |
| 0008 | 00002000 |
| ⋮ | |

| DETAIL CODE A OF ABNORMAL CONDITION WHICH OCCURRED | 00080011 | 00007000 |
|---|---|---|

| DETAIL CODE B OF ABNORMAL CONDITION WHICH OCCURRED | 00080011 | 00010500 |
|---|---|---|

FIG. 9C

| DETAIL CODE C OF ABNORMAL CONDITION WHICH OCCURRED | 00110022 | 00013005 |
|---|---|---|

| MONOCHROME IMAGE | COLOR IMAGE | MONOCHROME IMAGE | COLOR IMAGE | MONOCHROME IMAGE |
|---|---|---|---|---|
| 1000 SHEETS | 1 SHEET | 2500 SHEETS | 1 SHEET | 2500 SHEETS |

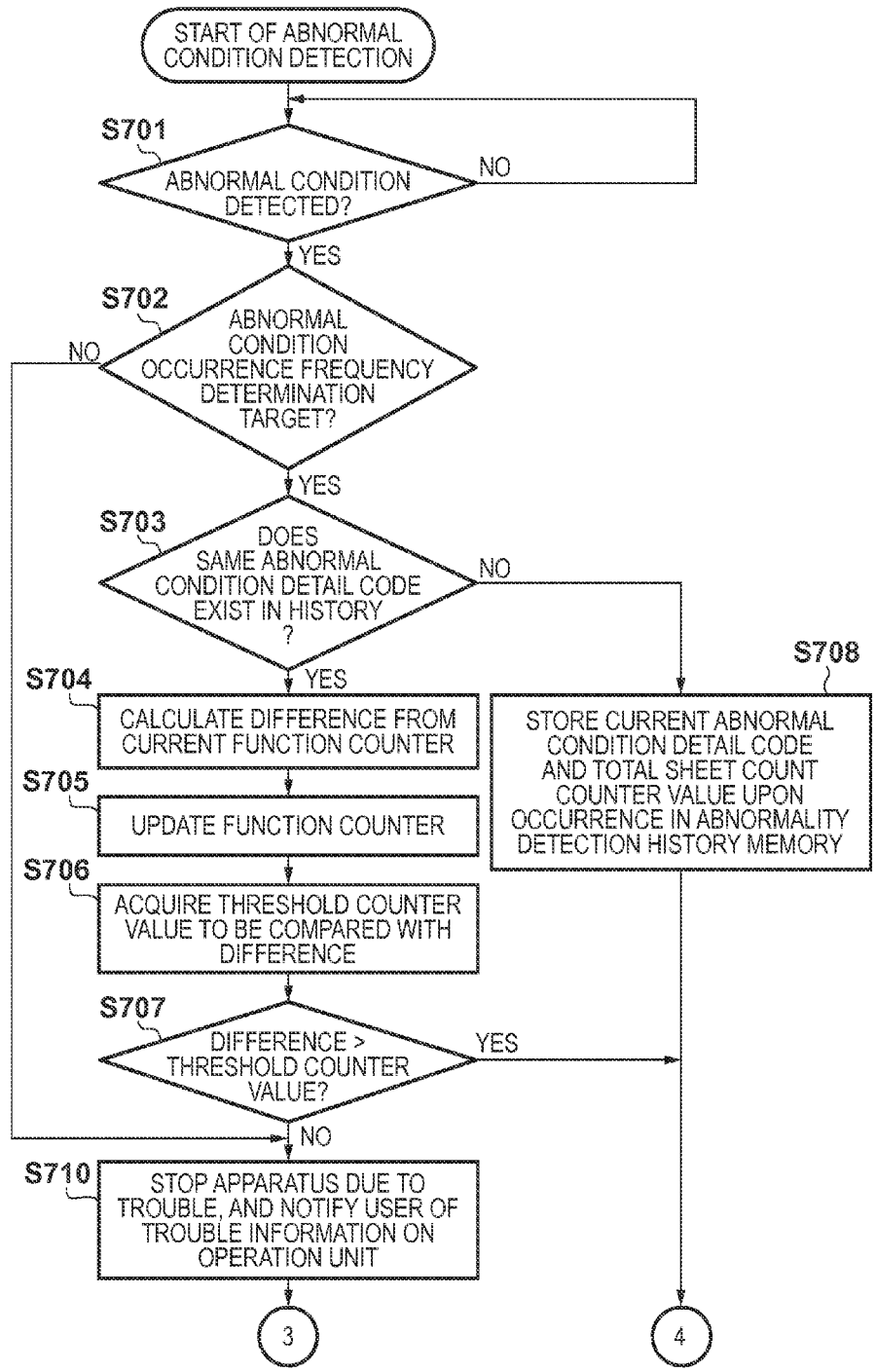

F I G. 13A

| ABNORMALITY DETECTION HISTORY MEMORY ADDRESS | ABNORMAL CONDITION DETAIL CODE | TOTAL SHEET COUNT COUNTER VALUE UPON OCCURRENCE OF ABNORMAL CONDITION | FUNCTION COUNTER VALUE UPON OCCURRENCE OF ABNORMAL CONDITION | ANOTHER ADDITIONAL INFORMATION 2 |
|---|---|---|---|---|
| 00000001 | 00010044 | 00001000 | 00000000 | 00000000 |
| 00000002 | 00040022 | 00005000 | 00000000 | 00000000 |
| 00000003 | 00320033 | 00000000 | 00004830 | 00000000 |
| 00000004 | 00070011 | 00020022 | 00000000 | 00000000 |
| 00000005 | 00220011 | 00000000 | 0005212 | 00000000 |

1301   1302   1303

F I G. 13B

| ABNORMALITY DETECTION HISTORY MEMORY ADDRESS | ABNORMAL CONDITION DETAIL CODE | TOTAL SHEET COUNT COUNTER VALUE UPON OCCURRENCE OF ABNORMAL CONDITION | FUNCTION COUNTER VALUE UPON OCCURRENCE OF ABNORMAL CONDITION | ANOTHER ADDITIONAL INFORMATION 2 |
|---|---|---|---|---|
| 00000001 | 00010044 | 00001000 | 00000000 | 00000000 |
| 00000002 | 00040022 | 00005000 | 00000000 | 00000000 |
| 00000003 | 00320033 | 00000000 | 00004830 | 00000000 |
| 00000004 | 00070011 | 00020022 | 00000000 | 00000000 |
| 00000005 | 00220011 | 00000000 | 00006328 | 00000000 |

FIG. 14

| ABNORMAL CONDITION DETAIL CODE | OCCURRENCE FREQUENCY DETERMINATION THRESHOLD COUNTER VALUE FOR TOTAL SHEET COUNT COUNTER | OCCURRENCE FREQUENCY DETERMINATION THRESHOLD COUNTER VALUE FOR FUNCTION COUNTER |
|---|---|---|
| 0001 | 00002000 | 00000000 |
| 0002 | 00002000 | 00000000 |
| ⋮ | ⋮ | ⋮ |
| 0022 | 00000000 | 00002000 |
| ⋮ | ⋮ | ⋮ |
| 0032 | 00000000 | 00001500 |
| ⋮ | ⋮ | ⋮ |
| 1401 | 1402 | 1403 |

FIG. 15

| DETAIL CODE D OF ABNORMAL CONDITION WHICH OCCURRED | 00220011 | 00000000 | 00006328 |
|---|---|---|---|
| | 1501 | 1502 | 1503 |

F I G. 18

| ABNORMALITY DETECTION HISTORY MEMORY ADDRESS | ABNORMAL CONDITION DETAIL CODE | TOTAL SHEET COUNT COUNTER VALUE UPON OCCURRENCE OF ABNORMAL CONDITION | FUNCTION COUNTER VALUE UPON OCCURRENCE OF ABNORMAL CONDITION | PROCESS SPEED INFORMATION UPON OCCURRENCE OF ABNORMAL CONDITION |
|---|---|---|---|---|
| 00000001 | 00010044 | 00001000 | 00000000 | 00000000 |
| 00000002 | 00040022 | 00005000 | 00000000 | 00000001 |
| 00000003 | 00320033 | 00000000 | 00004830 | 00000000 |
| 00000004 | 00070011 | 00020022 | 00000000 | 00000001 |
| 00000005 | 00220011 | 00000000 | 0005212 | 00000000 |

IMAGE FORMING APPARATUS AND CONTROL METHOD THEREOF

BACKGROUND OF THE INVENTION

1. Field of the Invention

The present invention relates to an image forming apparatus and control method thereof. Particularly, the present invention relates a technique regarding notification of a trouble state in the image forming apparatus.

2. Description of the Related Art

In general, when an image forming apparatus such as a printer detects a trouble in it, it displays an error code specifying the trouble location on the operation unit, and notifies the user of the trouble. The image forming apparatus prompts the user to report the gist of the notification to a serviceman, thereby solving the trouble.

However, even if an error occurs owing to an electrical event, the apparatus itself is not actually damaged in most cases. Examples of the electrical event are a communication failure arising from sudden electrical noise generated by static electricity, a sensor input signal detection error, and a malfunction caused by an unstable electrical element operation which may temporarily occur owing to insufficient voltage application upon instantaneous voltage drop. Also, a driving failure sometimes arises from an externally generated excessive load applied to the internal driving source of the apparatus due to an unexpected operation error in the use of the apparatus by the user.

In most cases, the apparatus can originally recover from such an abnormal condition to a normal condition without calling a serviceman. However, the apparatus notifies the user of trouble information on the operation unit, so the user reports the trouble information to the serviceman. This may arouse a fear of generating a period during which the user cannot use the apparatus, and a fear of causing unnecessary work by a serviceman.

To solve this problem, there is disclosed a technique of determining the occurrence of an abnormal condition for which a serviceman need not be called. For example, in Japanese Patent Laid-Open No. 2011-131536, a control unit configured to detect a trouble stores, for each trouble type, information representing whether or not a trouble has been detected. After detecting a trouble, if the control unit detects the same trouble within a predetermined period, it notifies the user of information about the trouble. If the control unit does not detect the same trouble within the predetermined period, it cancels information representing that the trouble which occurred previously has been detected, thereby changing the information to information representing that no trouble has been detected.

In Japanese Patent Laid-Open No. 2011-131536, when the same trouble has not occurred within a predetermined time after the trouble occurred previously, stored information representing that the trouble has been detected is canceled. However, considering this control applied to actual use by a user, even in a situation in which a component in the apparatus is being damaged, the trouble detection information is canceled upon the lapse of the predetermined time. As a result, the user may not be notified of the trouble information.

For example, a case in which the user prints out a specific set of image information data from the image forming apparatus (to be referred to as a job hereinafter) will be explained. The number of sheets printed out from the image forming apparatus varies for each user of the image forming apparatus. Assume that the printout sheet count is excessively small for a given user. Also, assume that when this user uses the image forming apparatus, there is a target component whose trouble would be usually detected during execution of a job, part of this component is actually being damaged, and the component operates unstably.

For example, assume that one wire out of a bundle of electrical wires is being disconnected and a contact failure has occurred. In this case, the apparatus may operate normally or abnormally. If the operation is determined to be normal without detecting the trouble of this component immediately after the trouble is detected once after the start of executing the job, information about the trouble of the component changes from a trouble detection state to a no-trouble detection state upon the lapse of time from the timing when the trouble was detected once. When another user uses the apparatus again, the trouble is detected once again during execution of a job, the apparatus stops, and then the apparatus returns again to a normal operation. Such an unstable operation repetitively occurs. As a result, the user may not be notified of reliable trouble information.

Trouble detection is similarly performed during a period other than during execution of a job. When a trouble detection target component in the apparatus is being damaged and operates unstably, if information about detection of a trouble changes to a no-detection state upon the lapse of time in a case in which, for example, the apparatus stands still for a long period, the user may not be notified of trouble information upon detection of the trouble. This also applies to a case in which, during execution of a function which is rarely used, a trouble of an apparatus component regarding execution of this function is detected.

Since trouble information is rarely notified, the apparatus remains used in an unstable state to the end of time. If the user keeps using the apparatus in this state, a damaged component may affect a normal component. This makes it difficult to specify the original cause of the trouble.

SUMMARY OF THE INVENTION

According to one aspect of the present invention, there is provided an image forming apparatus which detects an abnormal condition of the image forming apparatus and notifies a user of the abnormal condition, comprising: a detection unit configured to detect the abnormal condition of the image forming apparatus; a storage unit configured to store, as history information, information about a type of the abnormal condition and an occurrence situation of the abnormal condition in a case where the detection unit detects the abnormal condition; a determination unit configured to determine, by using information about a type of an abnormal condition which has newly occurred and an occurrence situation of the abnormal condition, and the information about the type of the abnormal condition and the occurrence situation of the abnormal condition that is stored as the history information, whether an occurrence frequency of the abnormal condition which has newly occurred is higher than a predetermined frequency; and a notification unit configured, in a case where an abnormal condition has newly occurred and the determination unit determines that the occurrence frequency of the abnormal condition which has newly occurred is higher than the predetermined frequency, to stop the image forming apparatus and to notify the user of trouble information for making a repair request by the user, and in a case where an abnormal condition has newly occurred and the determination unit determines that the occurrence frequency of the abnormal condition which has newly occurred is not higher than the predetermined frequency, to stop the image forming apparatus and to notify the user of a recovery method for recovering the image forming apparatus from the abnormal condition.

According to another aspect of the present invention, there is provided a method of controlling an image forming apparatus which detects an abnormal condition of the image forming apparatus and notifies a user of the abnormal condition, comprising: detecting the abnormal condition of the image forming apparatus; storing, as history information in a storage unit, information about a type of the abnormal condition and an occurrence situation of the abnormal condition in a case where the abnormal condition is detected in the detecting step; determining, by using information about a type of an abnormal condition which has newly occurred and an occurrence situation of the abnormal condition, and the information about the type of the abnormal condition and the occurrence situation of the abnormal condition that is stored as the history information, whether an occurrence frequency of the abnormal condition which has newly occurred is higher than a predetermined frequency; in a case where an abnormal condition has newly occurred and the occurrence frequency of the abnormal condition which has newly occurred is determined in the determining step to be higher than the predetermined frequency, stopping the image forming apparatus and notifying the user of trouble information for making a repair request by the user, and in a case where an abnormal condition has newly occurred and the occurrence frequency of the abnormal condition which has newly occurred is determined in the determining step not to be higher than the predetermined frequency, stopping the image forming apparatus and notifying the user of a recovery method for recovering the image forming apparatus from the abnormal condition.

A trouble state which may frequently occur in an image forming apparatus in an unstable state in which a component is actually damaged or being damaged is reliably detected, and the user is notified of error information. As for a trouble which intermittently occurs due to a detection error in a damage-free state, the user can recover the image forming apparatus to a normal condition.

Further features of the present invention will become apparent from the following description of exemplary embodiments (with reference to the attached drawings).

BRIEF DESCRIPTION OF THE DRAWINGS

FIG. 4 is a block diagram exemplifying the arrangement of the external I/F processing unit of the image forming apparatus;

FIGS. 6A and 6B are flowcharts showing processing in the image forming apparatus;

FIGS. 7A, 7B, 7C, and 7D are tables exemplifying information held in an abnormality detection history memory 180;

FIG. 8 is a table exemplifying information for determining the occurrence frequency of an abnormal condition upon occurrence of the abnormal condition;

FIGS. 9A, 9B, and 9C are views for explaining occurrence examples of troubles;

FIGS. 12A and 12B are flowcharts showing processing in the image forming apparatus;

FIGS. 13A and 13B are tables exemplifying information held in the abnormality detection history memory 180;

FIG. 14 is a table exemplifying information for determining the occurrence frequency of an abnormal condition upon occurrence of the abnormal condition;

FIG. 15 is a view exemplifying occurrence of an abnormal condition;

FIG. 18 is a table exemplifying information held in the abnormality detection history memory 180;

DESCRIPTION OF THE EMBODIMENTS

Arrangement of Image Forming Apparatus

Figure 1:
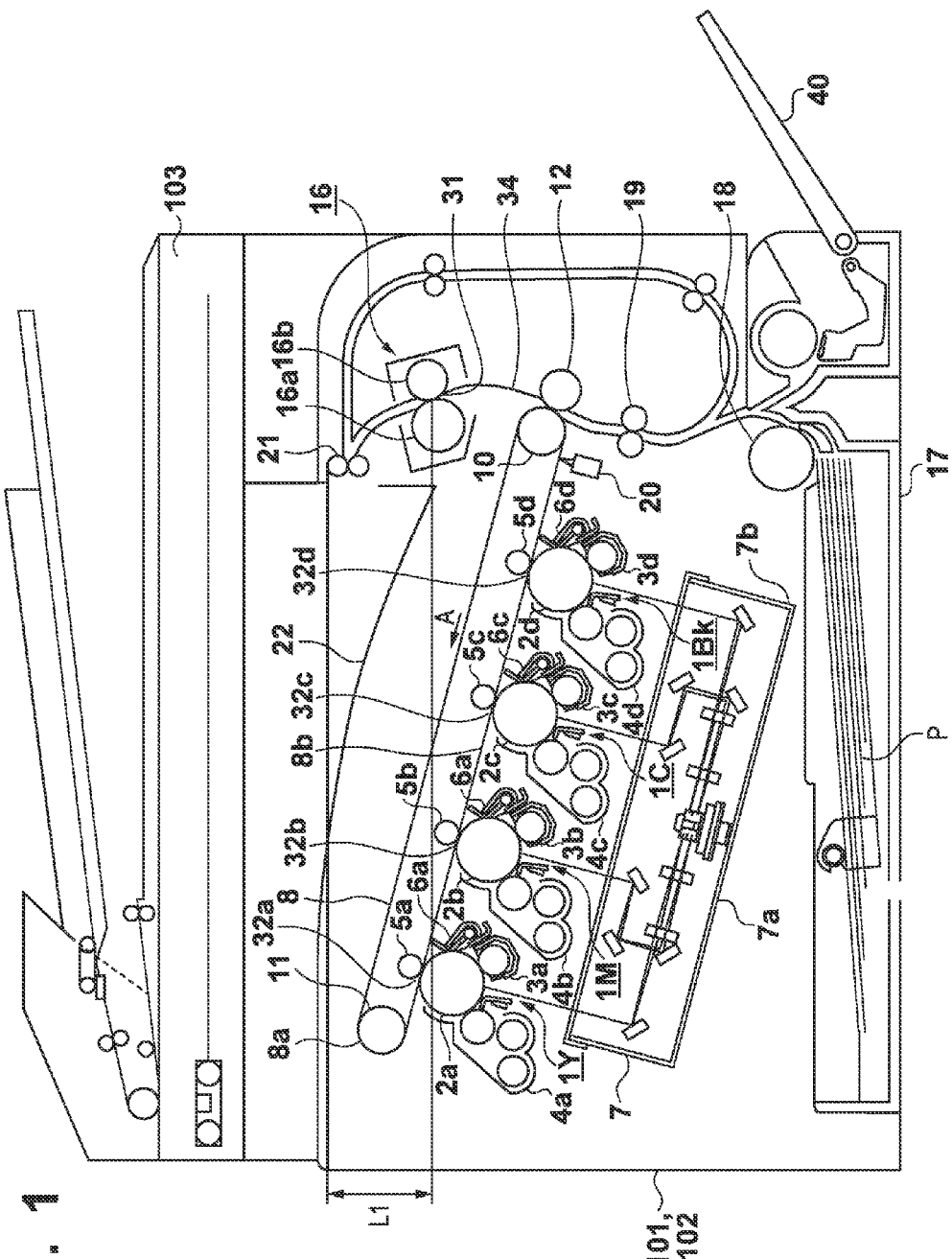
FIG. 1 is a view exemplifying the schematic arrangement of an image forming apparatus.

FIG. 1 is a schematic view exemplifying an electrophotographic image forming apparatus (color printer) having a tandem intermediate transfer belt (intermediate transfer unit) according to the present invention. An image forming apparatus 101 includes four image forming units: an image forming unit 1Y which forms a yellow image, an image forming unit 1M which forms a magenta image, an image forming unit 1C which forms a cyan image, and an image forming unit 1Bk which forms a black image. The four image forming units 1Y, 1M, 1C, and 1Bk are arranged in line at predetermined intervals. A cassette 17 is arranged below the image forming units 1Y, 1M, 1C, and 1Bk. A material conveyance path is vertically formed, and a fixing unit 16 is arranged at an upper portion along the material conveyance path.

Respective units will be explained in detail. The image forming units 1Y, 1M, 1C, and 1Bk include drum type electrophotographic photosensitive members (to be referred to as photosensitive drums hereinafter) 2a, 2b, 2c, and 2d as image carriers, respectively. The photosensitive drums 2a, 2b, 2c, and 2d are surrounded by primary chargers 3a, 3b, 3c, and 3d, developing units 4a, 4b, 4c, and 4d, transfer rollers 5a, 5b, 5c, and 5d serving as transfer unit, and drum cleaners 6a, 6b, 6c, and 6d, respectively. A laser exposure device 7 is arranged below a position between the primary chargers 3a to 3d and the developing units 4a to 4d.

Each of the photosensitive drums 2a to 2d is a negatively charged OPC (Organic PhotoConductor) photosensitive member having a photoconductive layer on an aluminum drum base. The photosensitive drums 2a to 2d are driven to rotate at a predetermined process speed in a direction indicated by an arrow (clockwise) by a driving device (not shown). The primary chargers 3a to 3d serving as primary charging unit uniformly charge the surfaces of the photosensitive drums 2a to 2d to a predetermined negative potential by a charge bias applied from a charge bias power supply (not shown).

The laser exposure device 7 includes a laser emitting unit which emits light in accordance with time-series electrical digital pixel signals corresponding to supplied image information, a polygon lens, and a reflecting mirror. The laser exposure device 7 exposes the photosensitive drums 2a to 2d to form electrostatic latent images of the respective colors corresponding to image information on the surfaces of the photosensitive drums 2a to 2d that are charged by the primary chargers 3a to 3d. The detailed arrangement of the laser exposure device 7 will be described later.

The developing units 4a, 4b, 4c, and 4d store yellow toner, cyan toner, magenta toner, and black toner, respectively. The developing units 4a to 4d apply the respective color toners onto the electrostatic latent images formed on the photosensitive drums 2a to 2d, developing (visualizing) the electrostatic latent images as toner images. The transfer rollers 5a to 5d are arranged to be able to contact the photosensitive drums 2a to 2d via an intermediate transfer belt 8 at primary transfer portions 32a to 32d. The toner images on the photosensitive drums 2a to 2d are sequentially transferred onto the intermediate transfer belt 8 and superposed on each other.

The drum cleaners 6a to 6d include cleaning blades and the like. The drum cleaners 6a to 6d scrape toners remaining on the photosensitive drums 2a to 2d from them, cleaning the surfaces of the photosensitive drums 2a to 2d. The intermediate transfer belt 8 is arranged above the photosensitive drums 2a to 2d, and looped between a secondary transfer counter roller 10 and a tension roller 11. The secondary transfer counter roller 10 is arranged to be able to contact a secondary transfer roller 12 via the intermediate transfer belt 8. The intermediate transfer belt 8 is made of a dielectric resin such as polycarbonate, a polyethylene terephthalate resin film, or a polyvinylidene fluoride resin film.

The secondary transfer roller 12 and secondary transfer counter roller 10 transfer an image on the intermediate transfer belt 8 onto a material (printing medium) such as paper conveyed from a paper feed unit. A belt cleaning device (not shown) which removes and recovers toner remaining on the surface of the intermediate transfer belt 8 is installed outside the intermediate transfer belt 8 and near the tension roller 11. By these processes, images of the respective toners are formed.

The paper feed unit includes the cassette 17 which stores materials P, a manual feed tray 40, and a pickup roller (not shown) which feeds the materials P one by one from the cassette 17 or manual feed tray 40. The paper feed unit further includes a paper feed roller which conveys the material P picked up by each pickup roller up to registration rollers, a paper feed guide 18, and registration rollers 19 which supply the material P to a secondary transfer region in synchronism with the image forming timing of the image forming unit.

The fixing unit 16 includes a fixing film 16a including a heat source such as a ceramic board incorporating a heater, and a press roller 16b which is paired with the fixing film 16a to sandwich and press the material P. At this time, the heat source of the fixing film 16a heats the material P. Note that the press roller 16b may include a heat source. A pre-fixing guide 34 which guides the material P to a nip 31 between the paired rollers, and an external discharge roller 21 for guiding the material P discharged from the fixing unit 16 outside the apparatus are arranged on a conveyance path connected to the fixing unit 16.

A control unit which controls the respective processing units in the image forming apparatus 101 includes a control board for controlling the operation of a mechanism in the fixing unit 16, and a motor driver board (not shown).

Note that the following description uses terms "abnormal condition" and "trouble". In this specification, "abnormal condition" indicates a state in which the apparatus does not operate normally, and a state in which an apparatus state including damage to a component and the like has not been clarified completely. "Trouble" indicates a state in which the apparatus is highly likely not to operate completely, including damage to a component and the like.

Various abnormal conditions to be described in the embodiment are detected at the following timings for the operations of a component and apparatus pertaining to each processing control or for a control operation itself. That is, abnormal condition detection is executed at the timing when image formation is executed, and the timing of pre-multiple rotation processing to allow accepting a job from the outside immediately after power-on. Further, abnormal condition detection is executed at the timing of pre-rotation processing to execute preparation processing to allow image formation for a job accepted immediately before the start of image formation, and the timing of post-rotation processing to allow executing the next job immediately after the end of image formation. Abnormal condition detection processing may also be executed at another timing.

Figure 2:
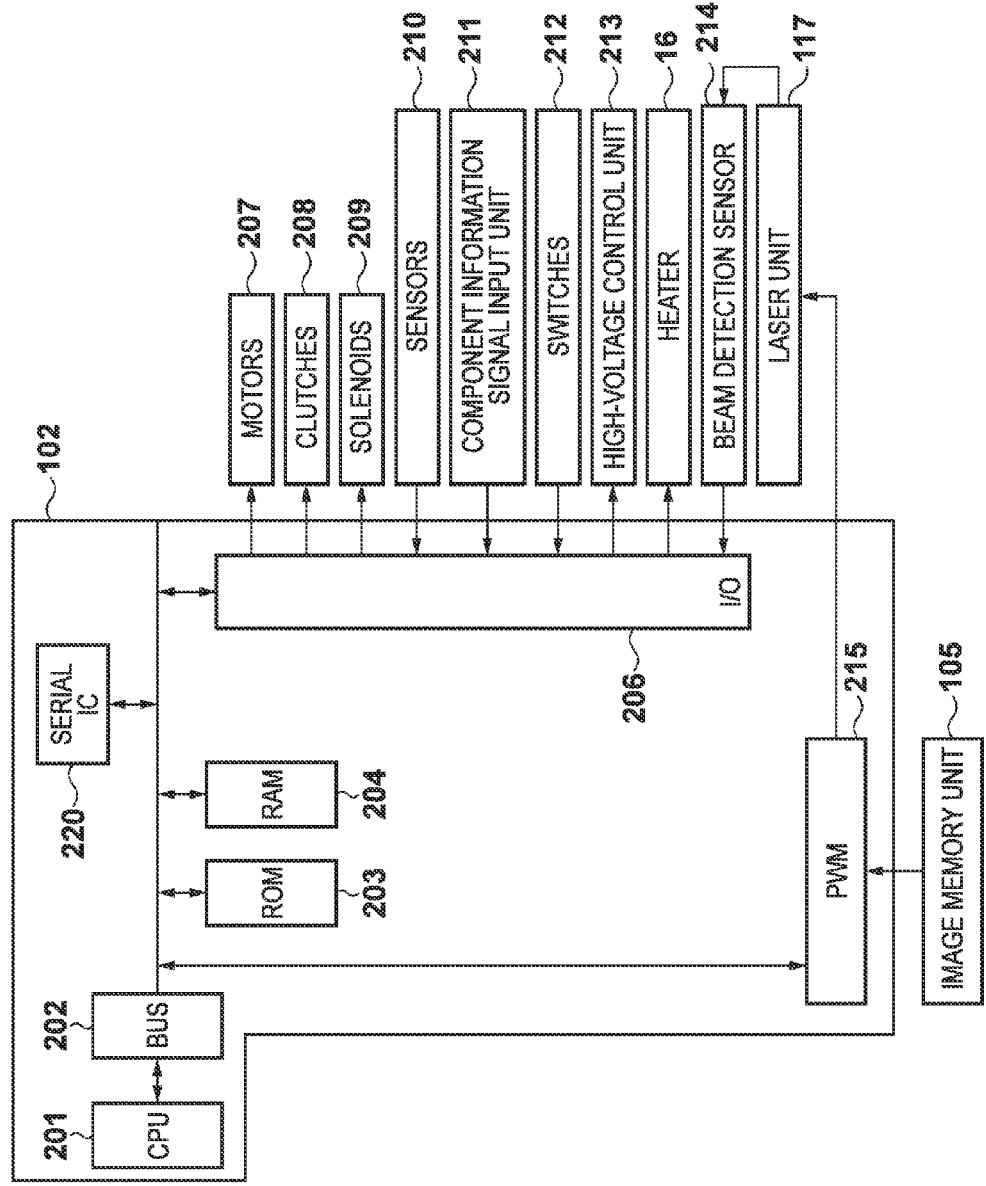
FIG. 2 is a block diagram exemplifying the arrangement of the printer unit of the image forming apparatus.

In abnormal condition detection according to the embodiment, it is detected that an abnormal condition has occurred when detection signals defined as normal values in each situation are not detected among signals detected by sensors 210 or the like in FIG. 2, or various signals from a component information signal input unit 211. Also, when a communication failure occurs in communication processing during communication control between predetermined components in the apparatus, a CPU 201 which controls the communication processing determines and detects "abnormal condition".

Figure 3:
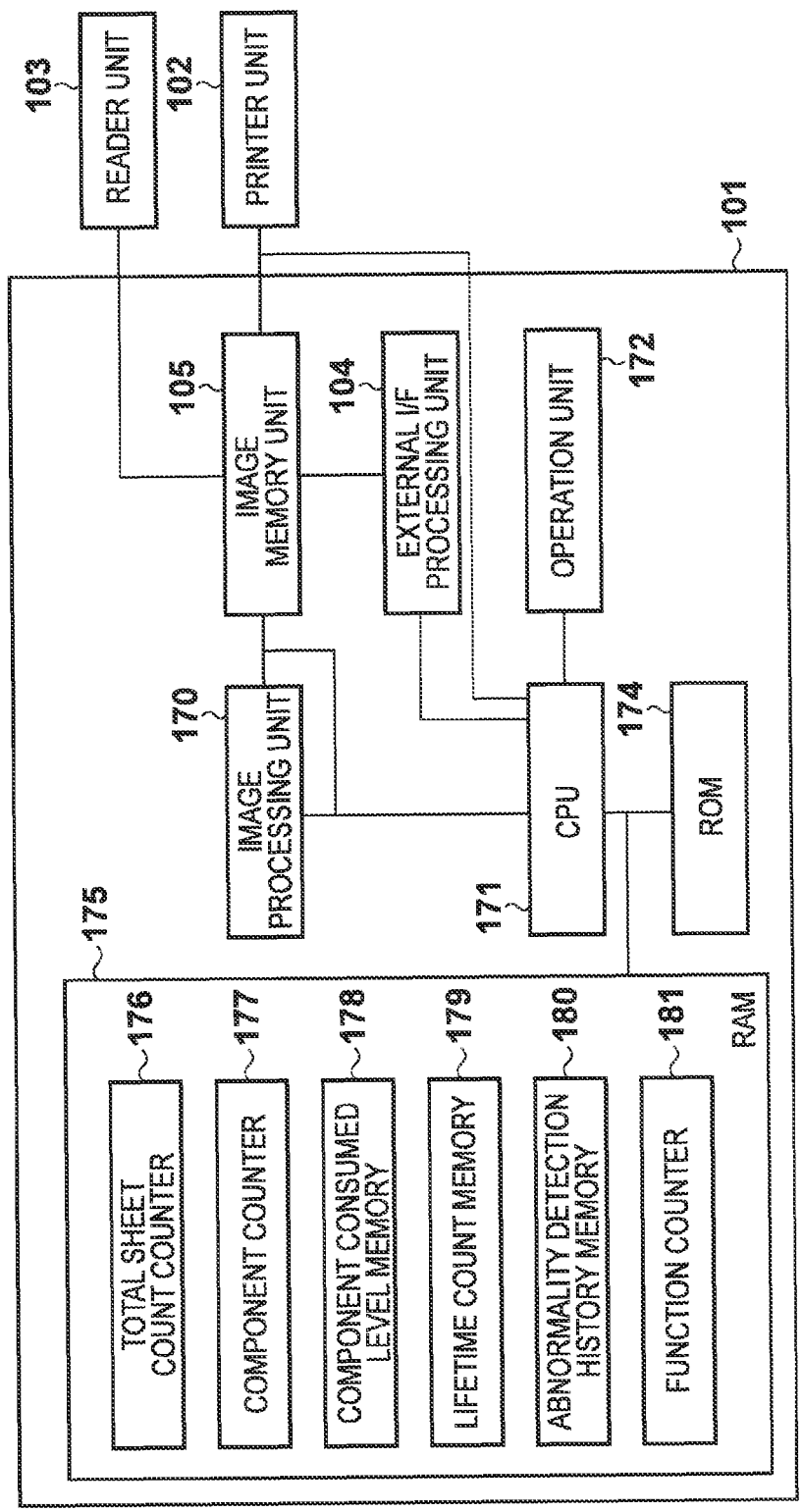
FIG. 3 is a block diagram exemplifying the arrangement of the image forming apparatus.

Information about a detected abnormal condition is temporarily stored and managed in a RAM 204 of FIG. 2 by the CPU 201 of a printer unit 102 immediately after the abnormal condition is detected. Then, a CPU 171 which controls the overall image forming apparatus 101 in FIG. 3 is notified of the information together with various types of control information. A RAM 175 stores the information about the abnormal condition of which the CPU 171 is notified. The CPU 171 decides processing of the overall image forming apparatus 101, including stopping image formation in the abnormal condition.

FIG. 3 is a control block diagram showing a control unit in the image forming apparatus 101. The CPU 171 performs basic control of the overall image forming apparatus 101. The CPU 171 is connected to a ROM 174 in which control programs are written, the RAM 175 for performing processing and the like via an address bus and data bus. The CPU 171 exchanges various types of control information with the printer unit 102 and a reader unit 103 according to control programs stored in the ROM 174. The CPU 171 sequentially executes input/output control and controls the image forming operation.

Various types of control information contain information about abnormal conditions detected in various devices of the printer unit 102 and reader unit 103. The CPU 171 determines and manages notified information about an abnormal condition. Then, the CPU 171 determines the detailed situation of the abnormal condition of a target component from the notified information about the abnormal condition, and decides a processing operation after the occurrence of the abnormal condition for the image forming apparatus 101.

The CPU 171 is connected to an operation unit 172, and controls the display unit and key input unit of the operation unit 172. The operator of the image forming apparatus 101 instructs the CPU 171 via the key input unit to switch the display between the image forming operation mode, the reading mode, and the printout mode. The operation unit 172 also displays the state of the image forming apparatus 101 and an operation mode setting based on a key input. When an abnormal condition is detected to determine a trouble, the operation unit 172 notifies the operator of the detailed information of the trouble by displaying it as a trouble code, details of which will be described later. The operation unit 172 is also used to display necessary information and the like in order to recover the apparatus from the trouble condition to a normal condition by user work.

A partial memory area in the RAM 175 has a structure capable of backing up various types of control information by power supply from the outside such as a battery. The memory area includes a total sheet count counter 176, component counter 177, component consumed level memory 178, lifetime count memory 179, abnormality detection history memory 180, and function counter 181. The total sheet count counter 176 is an area where the total number of prints of the image forming apparatus 101 is counted and stored. The component counter 177 is an area where the number of times of use is counted for each component. The component consumed level memory 178 is an area where information about the consumed level of a component selected on the operation unit 172 is stored. The lifetime count memory 179 is an area where a lifetime counter value (reference value) serving as the criterion to determine the lifetime (time to replace) of a component is stored. The abnormality detection history memory 180 is an area where history information upon detecting an abnormality is detected.

[Total Sheet Count Counter]

Figure 19:
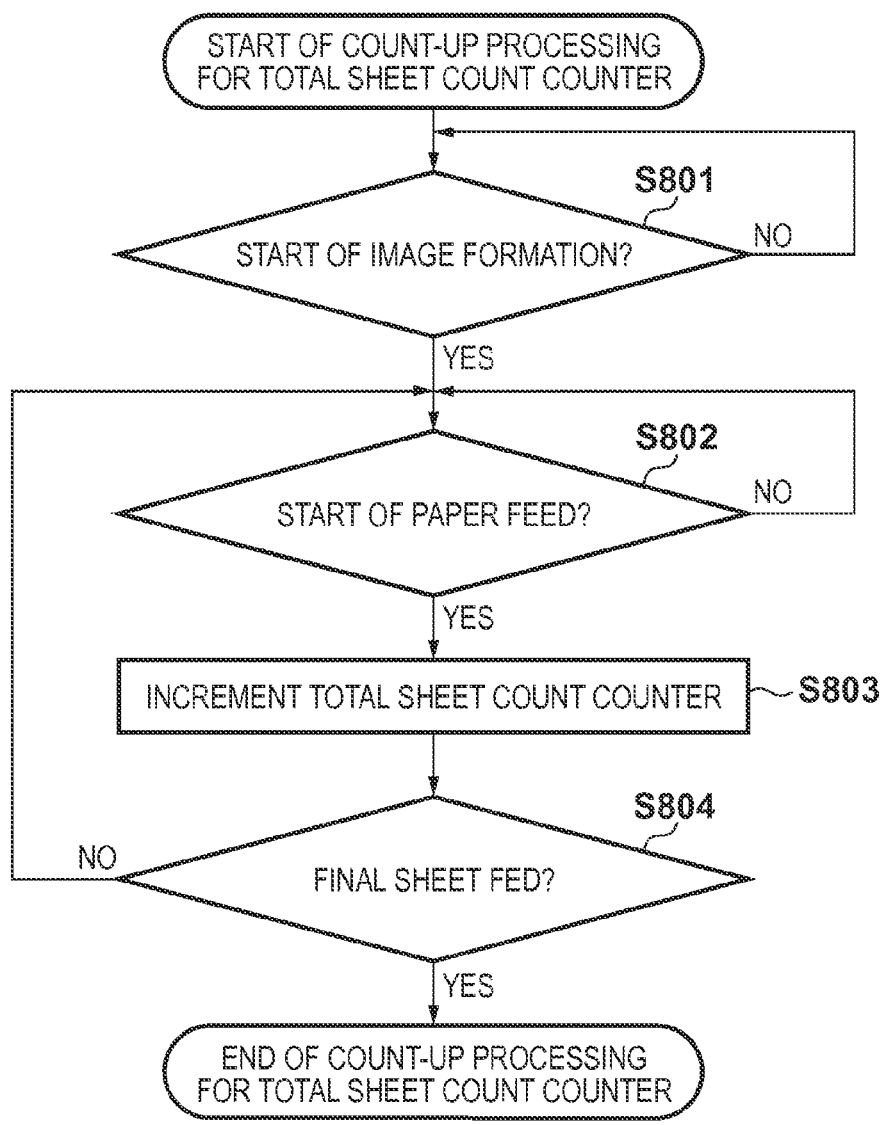
FIG. 19 is a flowchart for explaining a count-up method for a total sheet count counter.

The total sheet count counter 176 stores a value counted up in correspondence with the number of printed sheets every time the image forming apparatus 101 executes image formation. A count-up method for the total sheet count counter 176 will be explained with reference to the flowchart of FIG. 19. Note that the CPU 171 controls this processing.

After processing starts, the CPU 171 monitors whether image formation regarding a job has started (step S801). If image formation has started (YES in step S801), the CPU 171 monitors whether paper feed has started (step S802). If paper feed has started (YES in step S802), the CPU 171 increments the total sheet count counter 176 (step S803). After that, the CPU 171 monitors whether the final sheet has been fed (step S804).

If the fed sheet is not the final one in the job (NO in step S804), paper feed of the next sheet will always start. Thus, the process returns to step S802, and the CPU 171 waits for paper feed of the next sheet. During execution of the job, the total sheet count counter 176 is incremented every time paper feed starts. If paper feed of the final sheet in the job ends (YES in step S804), the total sheet count count-up processing ends.

[Function Counter]

Figure 20:
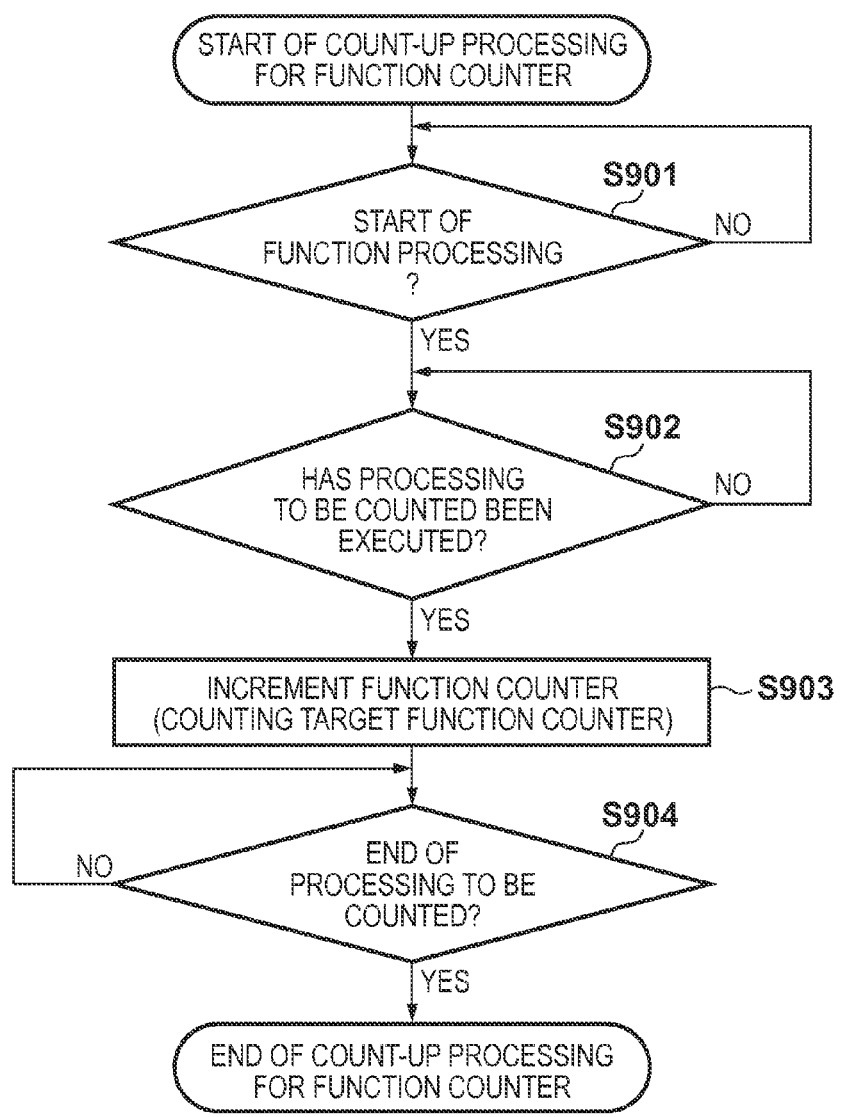
FIG. 20 is a flowchart for explaining a count-up method for a function counter.

The function counter 181 is assigned to each control function to be counted because there are many control functions to be executed by the image forming apparatus 101. Every time various target control functions are executed, the function counter 181 assigned to each function counts the execution. A count-up method for a counting target function counter 181 as an example of the function counter 181 will be explained with reference to the flowchart of FIG. 20. Note that the CPU 171 controls this processing.

After processing starts, the CPU 171 monitors whether target function processing has started (step S901). If target function processing has started (YES in step S901), the CPU 171 monitors whether counting target processing has actually been executed during execution of the function processing (step S902). If counting target processing has started (YES in step S902), the CPU 171 increments a function counter 181 corresponding to the processing (step S903).

Then, the CPU 171 monitors whether the counting target processing has ended (step S904). At this time, the CPU 171 waits until the counting target processing ends. If the counting target processing has ended (YES in step S904), the count-up processing for the function counter 181 ends.

[Component Counter]

The CPU 171 compares the counter value of the component counter 177 with that of the lifetime count memory 179, and determines the lifetime (time to replace) of a component based on the comparison result. Based on the determination result, the CPU 171 presents a predetermined display on the display unit of the operation unit 172.

When an abnormal condition occurs in the image forming apparatus 101, information about the abnormal condition is stored as history information in the abnormality detection history memory 180.

[Arrangement of Printer Unit]

FIG. 2 is a block diagram of the printer unit 102. The CPU 201 sequentially reads control procedures (control programs) from a ROM 203, and controls the printer unit 102. The RAM 204 is a main storage device used to store input data for use in internal processing of the printer unit 102, and as a work storage area and the like.

An I/O 206 is an interface with respective units. The I/O 206 is connected to respective units such as motors 207, clutches 208, solenoids 209, and the sensors 210 for driving the paper feed system, conveyance system, and optical system. As an example of the sensors 210, a residual toner detection sensor (not shown) is arranged for the developing unit 4 shown in FIG. 1 to detect the amount of toner in the developing unit 4. The I/O 206 also receives signals from switches 212 for detecting the home position of each unit, the opening/closing state of a door, and the like. A high-voltage control unit 213 outputs high-voltage power to the primary charger 3 and developing unit 4 shown in FIG. 1, a pre-transfer charger, transfer charger, and separation charger (none are shown), and the like in accordance with instructions from the CPU 201. A laser beam emitted by a laser unit 117 irradiates and exposes the photosensitive drum 2 in accordance with image data from an image memory unit 105. A beam detection sensor 214 serving as a light-receiving sensor detects an emission state in the non-image region, and inputs its output signal to the I/O 206.

[External I/F Processing Unit]

The arrangement of an external I/F processing unit 104 in the image forming apparatus 101 will be described with reference to FIG. 4. The external I/F processing unit 104 can output image data from a PC 100 to the printer unit 102 via the image memory unit 105.

The external I/F processing unit 104 includes a core unit 406, a hard disk (HD) 402 which saves image data, an interface unit 403 which connects the PC 100 or an external apparatus such as an external management server, and a formatter unit 404.

The interface unit 403 is a communication unit for performing data communication with an external apparatus. The interface used here may be a LAN cable, serial interface, SCSI interface, printer data input Centronics interface, or the like. The interface unit 403 mediates notification of the state of the printer unit 102 to the PC 100 and reception of print image data from the PC 100.

Image data notified from the PC 100 via the interface unit 403 is described in a dedicated printer description language (to be referred to as PDL (Page Description Language) hereafter). The formatter unit 404 analyzes the PDL of the image data, and rasterizes the image data into raster image data in an image memory unit 405. The rasterized raster image data is sent to the image memory unit 105, and the printer unit 102 executes image formation based on the raster image data.

The core unit 406 controls and manages data transfer from a FAX unit 401, the interface unit 403, the formatter unit 404, the image memory unit 405, and the image memory unit 105. Further, the core unit 406 manages various jobs generated by exclusive control, priority control, and the like for a printer job generated by the FAX unit 401, a printer job received from the PC 100, and a job generated by the reader unit 103. Image output is executed in order under the control of the core unit 406.

[Explanation of Example of Occurrence of Trouble]

Figure 5A:
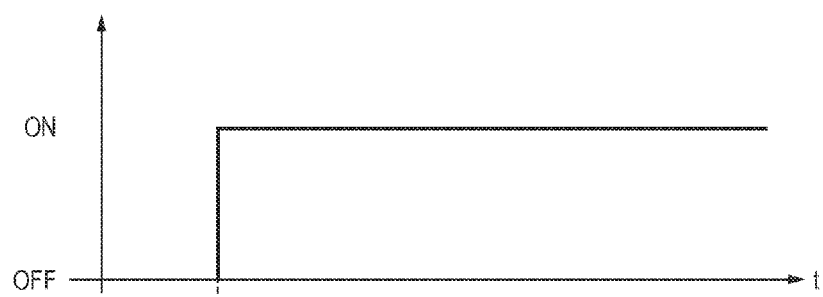
FIGS. 5A and 5B are views for explaining an example of occurrence of a motor trouble in the image forming apparatus.
Figure 5B:
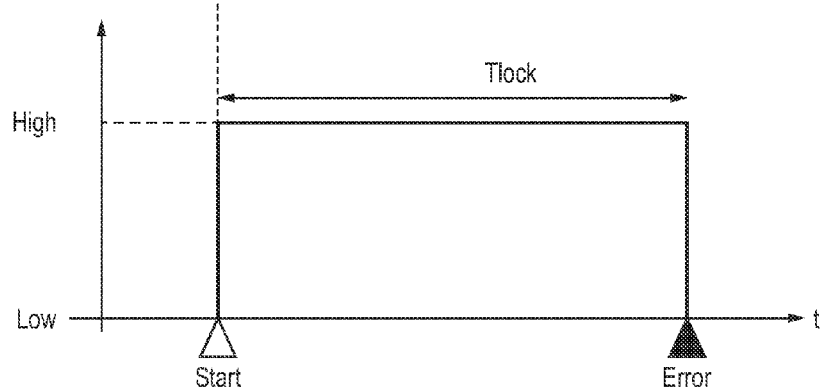

FIGS. 5A and 5B are views for explaining an example of occurrence of a trouble of one motor among the motors 207 of FIG. 2. FIG. 5A shows the ON/OFF state of the motor in time series. The ordinate represents ON/OFF switching, and the abscissa represents the time. FIG. 5B exemplifies the time-series operation of a Lock signal issued from the motor in the same time series as that in FIG. 5A. The ordinate represents the Lock signal, and the abscissa represents the time. In the relationship between FIGS. 5A and 5B, motor ON and Lock signal High correspond to each other. Also, motor OFF and Lock signal Low correspond to each other.

Note that the Lock signal of the motor is one signal from the component information signal input unit 211 in FIG. 2, and is used to detect the abnormal condition of the motor. The motors 207 in FIG. 2 include a DC brushless motor. The DC brushless motor is activated by changing a motor ON signal (not shown) from one port of the I/O 206 in FIG. 2 to the ON state as shown in FIG. 5A, and outputting it to the motor. A Lock signal output from the motor becomes High while the motor normally rotates, and Low while the motor stops.

In the example of FIG. 5B, the Lock signal output changes to the High state output because the motor starts up at the Start timing. Upon the lapse of the time Tlock, the Lock signal output abruptly changes to the Low state. In FIG. 5A, the activation signal remains ON, so the motor is controlled to operate. In FIG. 5B, however, the Lock signal output is in the Low state, which indicates that the motor stops.

The CPU 201 of the printer unit 102 in FIG. 2 determines that the motor has fallen into an abnormal condition because it has detected that the Lock signal is in the Low state (stop state) though the motor is active. At this time, the CPU 201 notifies, of motor abnormality information, the CPU 171 which manages and executes the overall processing of the image forming apparatus 101 in FIG. 3. When the CPU 171 is notified of the motor abnormality information, it stops the operation of the image forming apparatus 101. The CPU 171 stores, in the abnormality detection history memory 180, not only the motor abnormality information but also various types of abnormality information notified from inside the image forming apparatus 101 such as the printer unit 102 or reader unit 103.

[Outline of Processing]

Originally, it is preferable that a problem such as an abnormal operation in the apparatus or a trouble of an apparatus component does not occur. In practice, however, a control signal detection error sometimes occurs owing to an unpreferable operation state of the apparatus, for example, an externally generated forcible excessive load to the motor or suddenly generated electrical noise mixed into communication information.

The user is notified of such an abnormal operation detection error, and even if an apparatus component is not actually damaged, makes a repair request to a serviceman. The repair request is accompanied by call-out of the serviceman. This generates the time during which the user cannot use the apparatus, and the time of wasteful work by the serviceman.

To prevent this, information about an abnormal operation which occurred, and information about the abnormal operation are stored and managed using the abnormality detection history memory 180. By using the stored abnormal operation information, the history of information about abnormal operations which occurred in the past, and information about the abnormal operation which has occurred this time are compared to determine relevance between the occurrence situations of the abnormal operations.

Assume that the occurrence situations of the abnormal operations have relevance. For example, assume that a situation in which abnormal conditions frequently occur can be determined from their occurrence frequency by comparison with the past abnormal operation information stored in the abnormality detection history memory 180. The occurrence frequency of an abnormal condition is determined. Then, a damage situation in which an apparatus or component associated with the abnormal condition is highly likely not to be damaged, is damaged, or is being damaged is determined. In accordance with the determination, the user is notified of the information on the operation unit 172, reducing the burdens on the user and serviceman.

Several examples when the abnormal condition is detected will be explained. FIGS. 7A to 7D are tables exemplifying information stored in the abnormality detection history memory 180. In FIG. 7A, a detail code 7001 of an abnormal condition which occurred in the past, a total sheet count counter value 7002 upon occurrence of an abnormal condition, and the like are stored. The abnormal condition detail code is a code indicating the classification (type) of an abnormal condition which occurred. The code is defined in advance for each possible abnormal condition. FIGS. 7B to 7D show a state in which the contents of the abnormality detection history memory 180 are updated as processing proceeds, details of which will be described with reference to a flowchart.

The number of histories storable in the abnormality detection history memory 180 shown in FIG. 7A assumes a case in which a plurality of abnormal conditions occurred. The description of the embodiment assumes that the maximum number of different abnormal conditions is five even if they occur simultaneously. For history information, the storage areas of five pieces of history information are ensured.

Note that the abnormality detection history memory 180 does not store any information when the image forming apparatus 101 is new. However, the following description assumes a situation in which abnormal conditions occurred several times in the past, and assumes that pieces of information about the abnormal conditions which occurred in the past are stored in all the five areas of the abnormality detection history memory 180. In this state, assume that the user executes a job and processing to be described below is performed.

FIG. 8 shows information used to, when an abnormal condition is detected, determine whether the occurrence frequency of the abnormal condition is high. In the embodiment, to determine whether the occurrence frequency of a detail code 8001 of an abnormal condition which occurred is high, an abnormal condition occurrence frequency determination threshold counter value 8002 decided in advance by measurement or the like is defined and held in the storage unit. As an area where the abnormal condition occurrence frequency determination threshold counter value 8002 in FIG. 8 is stored, either the ROM area or RAM area is usable.

Note that the counter value shown in FIG. 8 is merely an example, and the counter value is not limited to this. For example, the threshold is fixed when the counter value is stored in the ROM area, and rewritable when it is stored in the RAM area. For example, when there is a component for which the occurrence situation of an abnormal condition changes depending on an environment where the apparatus is installed, the threshold can be changed for each apparatus. In this example, the threshold is set in consideration of the average number of sheets printed out by the user per month as the criterion of the threshold.

Depending on the type of abnormal condition, for example, when the abnormal condition of the fixing unit is detected, it may be controlled to determine a trouble immediately after the detection of the abnormal condition, notify the user of the trouble information, and stop the operation. There are several abnormal condition detection types for which a trouble is quickly determined without determining the occurrence frequency of an abnormal condition, in addition to an abnormal condition pertaining to the fixing unit. When an abnormal condition other than these abnormal conditions is detected, the occurrence frequency of the abnormal condition is determined, and a trouble/damage state is appropriately determined by taking account of the occurrence frequency of the abnormal condition.

FIGS. 9A to 9C exemplify abnormal conditions which occurred. Values shown in FIGS. 9A to 9C show examples each of an abnormal condition detail code 9001 for an abnormal condition which occurred, and a total sheet count counter value 9002 upon occurrence of the abnormal condition. A process and operation to update the values shown in FIG. 7A will be explained with reference to the flowcharts of FIGS. 6A and 6B using abnormal conditions shown in FIGS. 9A to 9C.

Figure 17A:
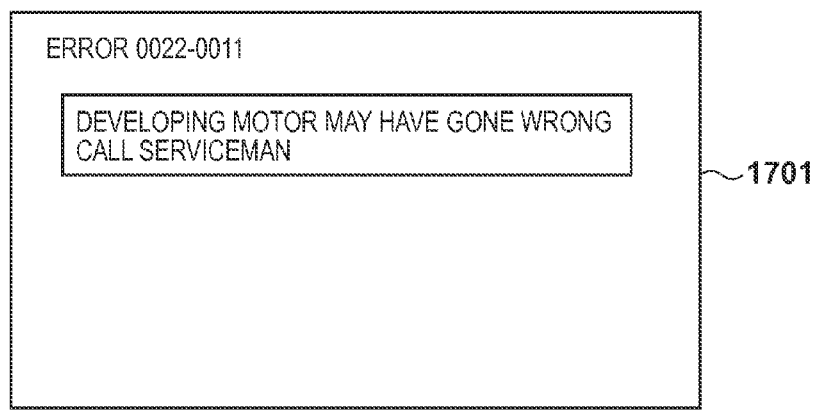
FIGS. 17A, 17B, and 17C are views each exemplifying a screen displayed on an operation unit 172 of the image forming apparatus.
Figure 17B:
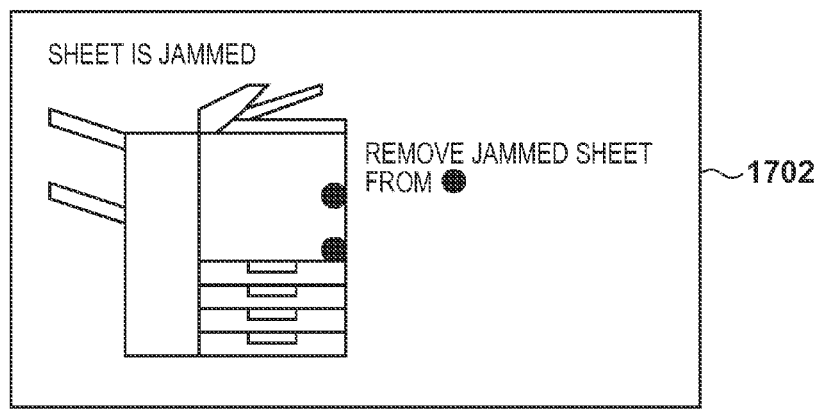
Figure 17C:
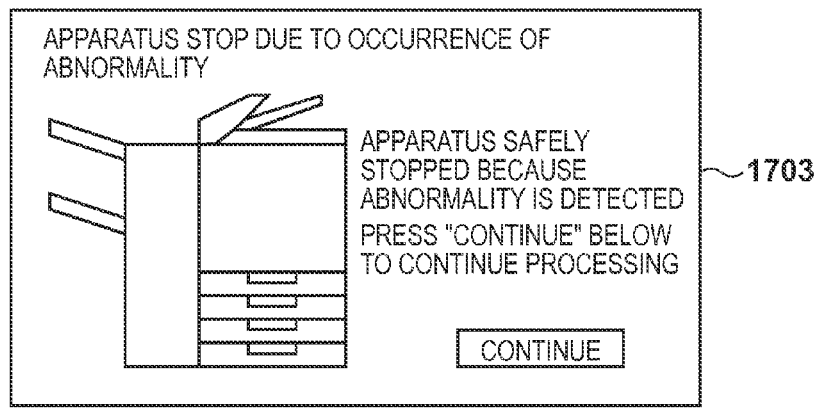

FIGS. 17A to 17C show screens each which notifies the user of a condition in the image forming apparatus. The display timing will be explained along with the processing sequence. The screens displayed on the operation unit 172, as shown in FIGS. 17A to 17C, are merely examples, and the user may be notified of a condition using another screen. Further, the user may be notified of a condition using a method other than the screen.

Figure 6B:
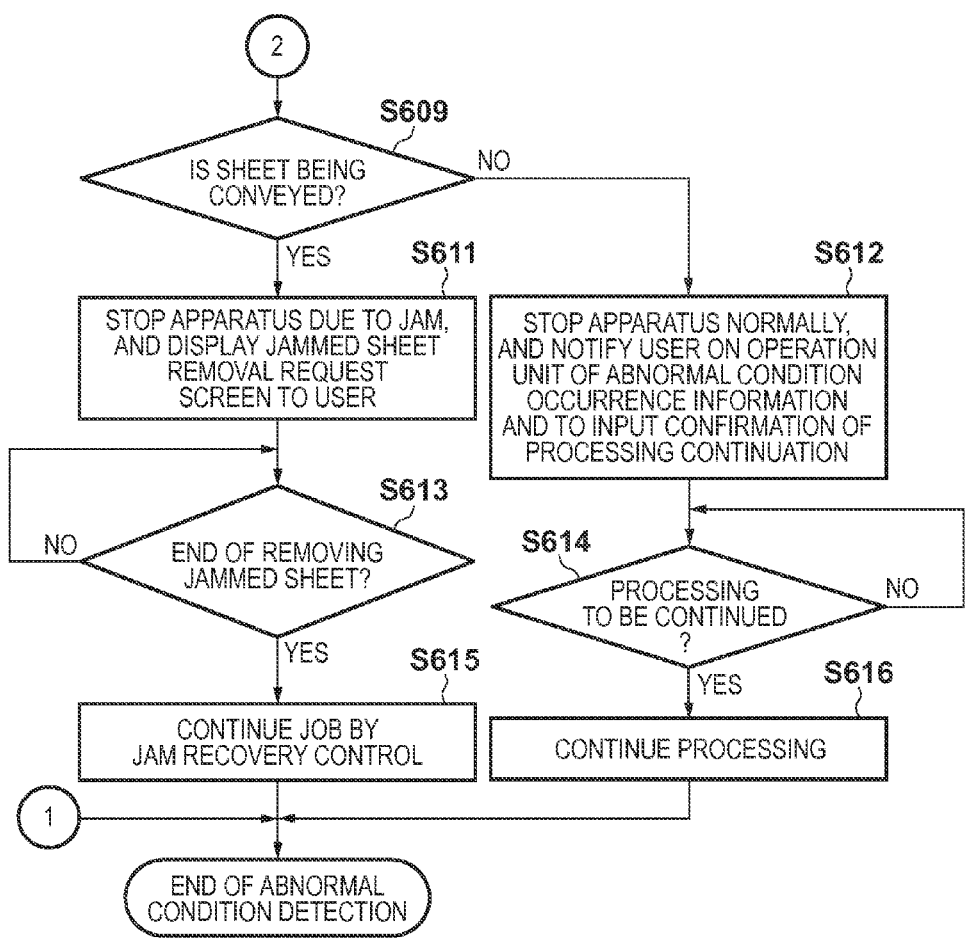

Note that the flowcharts shown in FIGS. 6A and 6B are implemented by reading out a program stored in the ROM 174 and executing it by the CPU 171 of the image forming apparatus 101.

[Example of Processing]

(1) Case in which it is Determined that Occurrence Frequency is High Upon Detecting Abnormal Condition A case in which a job is executed and an abnormal condition detail code A shown in FIG. 9A is generated will be explained with reference to the flowcharts of FIGS. 6A and 6B. The CPU 171 starts abnormal condition detection.

In FIG. 9A, the abnormal condition detail code 9001 "00080011" is detected as an abnormal condition which occurred (step S601). The total sheet count counter value 9002 at this time is "00007000 (sheets)". Assume that the abnormal condition detail code 9001 "00080011" is an abnormal condition detail code for which the occurrence frequency is determined to make trouble determination (YES in step S602). It is defined in advance whether to determine the occurrence frequency and make trouble determination.

In the abnormality detection history memory 180, pieces of information about five abnormal conditions which occurred in the past are already filled in the five storage areas (addresses "00000001" to "00000005"), as shown in FIG. 7A. The CPU 171 searches the detail codes 7001 of abnormal conditions that occurred in the past, which are stored in the abnormality detection history memory 180, and checks whether there is the same abnormal condition detail code as the detail code A "00080011" in FIG. 9A for the abnormal condition which has occurred this time.

In this example, the same code exists at the fifth address (address "00000005") from the top in the abnormality detection history memory 180 of FIG. 7A. This reveals that the same abnormal condition occurred previously (YES in step S603). Thus, the CPU 171 checks the total sheet count counter value 7002 obtained upon the previous occurrence. From a total sheet count counter value obtained upon the current occurrence and the target total sheet count counter value in the abnormality detection history memory 180, the CPU 171 determines whether the occurrence frequency of the abnormal condition which has occurred this time is high. In this example, to determine the occurrence frequency of the abnormal condition, the CPU 171 calculates the difference between the total sheet count counter value obtained when the abnormal condition occurred previously and the total sheet count counter value obtained when the abnormal condition has occurred this time (step S604). The difference is calculated by $$00007000 - 00006804 = 00000196 (\text{sheets})$$

The results indicates that the time corresponding to 196 (sheets) has elapsed after the previous abnormal condition occurred.

As described above, the occurrence history of the same abnormal condition ("00080011") exists in the abnormality detection history memory 180 in this case. Hence, the CPU 171 updates a storage area where the occurrence history is stored in the abnormality detection history memory 180 upon occurrence of the same abnormal condition, by overwriting the storage area with the total sheet count counter value obtained when the abnormal condition has occurred this time (step S605). That is, as shown in FIG. 7B, the CPU 171 overwrites data in the storage area of the address "00000005" with the total sheet count counter value "00007000".

Then, the CPU 171 determines the occurrence frequency of this abnormal condition. The CPU 171 acquires, from the information shown in FIG. 8, an abnormal condition occurrence frequency determination threshold counter value 8002 corresponding to the target abnormal condition detail code 8001. In this case, the CPU 171 acquires information in which the abnormal condition occurrence frequency determination threshold counter value 8002 is "00002000 (sheets)" (step S606). The CPU 171 compares the abnormal condition occurrence frequency determination threshold counter value with the difference obtained by the calculation in step S605 (step S607). In the example of the current occurrence of the abnormal condition, the comparison result is $$00000196 < 00002000$$

Since the difference is smaller than the threshold counter value, the CPU 171 determines that the occurrence frequency of the abnormal condition is high and a trouble such as damage to a component is highly likely to actually occur (NO in step S607).

The CPU 171 notifies the user of an abnormal condition detail code as trouble information on the operation unit 172, as represented by a screen 1701 in FIG. 17A (step S610). Then, the CPU 171 stops the apparatus due to the trouble, and ends the abnormal condition detection. When the user is notified of the trouble information, he recognizes the trouble information and makes a trouble repair request to a serviceman.

(2) Case in which it is Determined that Occurrence Frequency is not High Upon Detecting Abnormal Condition A case in which a job is executed and a detail code B of an abnormal condition which has occurred is generated as shown in FIG. 9B will be explained. Occurrence of the same abnormal condition as that in FIG. 9A (abnormal condition detail code: 00080011) is assumed. In the flowcharts of FIGS. 6A and 6B, a sequence up to steps S601 and S602 is the same as that in case (1).

Occurrence of the same abnormal condition as that in case (1) is assumed, and the abnormal condition history shown in FIG. 7B already exists in the abnormality detection history memory 180 (step S603). Thus, the CPU 171 compares the current total sheet count counter value with information stored in the storage area (address "00000005") of the fifth address in the past abnormal condition history information stored in the abnormality detection history memory 180. The current total sheet count counter value is "00010500 (sheets)". The previous (FIG. 7B upon updating) total sheet count counter value is "00007000 (sheets)". The CPU 171 calculates the difference between the previous total sheet count counter value and the current total sheet count counter value (step S604). In this case, 00010500−00007000=00003500(sheets)

This reveals that the time corresponding to 3500 (sheets) has elapsed after the occurrence of the previous trouble. The CPU 171 updates the same storage area as the previous one in the abnormality detection history memory 180, that is, data in the storage area of the fifth address, by overwriting the data with data of the total sheet count counter value upon occurrence of the abnormal condition, as shown in FIG. 7C (step S605). The CPU 171 overwrites the total sheet count counter value with "00010500".

Then, the CPU 171 determines the occurrence frequency of this abnormal condition. The CPU 171 acquires, from the information shown in FIG. 8, an abnormal condition occurrence frequency determination threshold counter value 8002 corresponding to the target abnormal condition detail code 8001. In this case, the CPU 171 acquires information in which the abnormal condition occurrence frequency determination threshold counter value 8002 is "00002000 (sheets)" (step S606). The CPU 171 compares the abnormal condition occurrence frequency determination threshold counter value with the difference obtained by the calculation in step S605 (step S607). In the example of the current occurrence of the abnormal condition, comparing the threshold counter value with the difference yields

00003500>00002000

Since the difference is larger than the threshold counter value, the CPU 171 determines that the occurrence frequency of the abnormal condition is lower than a predetermined frequency, and the occurrence frequency is not high (YES in step S607). In this case, the occurrence frequency of the abnormal condition is not high, so an abnormal condition is highly likely to be erroneously detected in control owing to sudden noise or the like. It is predicted that the component is not actually damaged.

Since the job is being executed, the CPU 171 determines whether a sheet is being conveyed in the apparatus (step S609). If a sheet is being conveyed at the timing when the abnormal condition occurs (YES in step S609), the CPU 171 normally discharges the sheet when the sheet can be normally discharged from the apparatus. When the sheet cannot be normally discharged, the CPU 171 temporarily handles this situation as a jam, and stops the apparatus. When a trouble is detected during execution of a job, if a sheet can be normally discharged and the apparatus can be normally stopped, the apparatus need not be stopped due to a jam. In this case, the apparatus temporarily stops due to a jam, so the CPU 171 notifies the user of jam occurrence information on the operation unit 172, as represented by a screen 1702 in FIG. 17B (step S611). Then, the user is prompted to remove the jammed sheet.

If it is detected that the user has removed the jammed sheet (YES in step S613), the CPU 171 makes preparations to internally continue the job, and continues the job by jam recovery processing (step S615). In this manner, the user can recover the apparatus to a normal condition without notifying him of trouble information on the operation unit 172.

If the sheet can be normally discharged and the apparatus can be normally stopped without stopping the apparatus due to a jam (NO in step S609), the CPU 171 notifies the user on the operation unit 172 of information representing that the apparatus has stopped because the abnormal condition is detected, as represented by a screen 1703 in FIG. 17C (step S612). Then, the user is prompted to input continuation of the job. If the processing continuation (job continuation) input by the user is accepted (YES in step S614), the CPU 171 makes preparations to internally continue the processing (job), and continues the processing (job) (step S616). Accordingly, the user can recover the apparatus to a normal condition without notifying him of trouble information on the operation unit 172. After that, the trouble detection ends.

Further, a case in which a detail code C of an abnormal condition which has occurred is generated as shown in FIG. 9C will be explained. In this case, an example in which a history representing that a trouble of the abnormal condition detail code C occurred previously does not exist in the abnormality detection history memory 180, as shown in FIG. 7C, will be described. Assume that the abnormal condition detail code C indicates detection of an abnormal condition for which trouble determination is made based on the occurrence frequency of the abnormal condition.

After the start of abnormal condition detection, the CPU 171 detects an abnormal condition as shown in FIG. 9C (step S601). This detection is detection of an abnormal condition for which trouble determination is made based on the occurrence frequency of the abnormal condition (YES in step S602). Since the abnormal condition which did not occur in the past has occurred (NO in step S603), the CPU 171 determines that the occurrence frequency is not high. In this example, the abnormality detection history memory 180 is assumed to have a structure capable of storing five pieces of history information. Pieces of information about abnormal conditions which occurred in the past are already filled in the five areas.

In this example, therefore, the CPU 171 updates an area of an address having the oldest total sheet count counter value upon occurrence of an abnormal condition, that is, an area of an address "00000001" in the abnormality detection history memory 180 of FIG. 7C by overwriting the area with information of the trouble which has occurred this time (step S608). As a result, a value at the address "00000001" in the abnormality detection history memory 180 is updated as shown in FIG. 7D.

If the abnormality detection history memory 180 has a structure capable of storing more than five pieces of abnormal condition history information, for example, a structure capable of storing all pieces of information about abnormal conditions which are assumed to occur, information can be saved for each abnormality information type. In practice, however, the structure capable of storing many pieces of abnormal condition history information raises the cost and is not desirable in terms of the cost. For this reason, as abnormal condition history information storage areas, a proper number of storage areas are preferably ensured in consideration of the whole apparatus arrangement.

For an abnormal condition which occurs for the first time (or is not stored in the storage area), the occurrence frequency of the abnormal condition cannot be determined, so it is unknown whether a portion in the apparatus is actually damaged. If a portion in the apparatus is damaged or being damaged, the abnormal condition is highly likely to occur even in an immediately subsequent operation. In the first occurrence of an abnormal condition, the user makes preparations so that the apparatus can recover to a normal condition.

Processing of making preparations by the user so that the apparatus can recover to a normal condition is the same as the above-described recovery processing executed when the occurrence frequency of an abnormal condition is not high. More specifically, if a sheet is being conveyed (YES in step S609), the CPU 171 handles this situation as a jam, stops the apparatus, and notifies the user of jam occurrence information on the operation unit 172, as represented by the screen 1702 in FIG. 17B (step S611). Then, the user is prompted to remove the jammed sheet. If the end of removing the jammed sheet by the user is detected (YES in step S613), the CPU 171 makes preparations to internally continue the job, and continues the job by jam recovery processing (step S615).

If the sheet can be normally discharged and the apparatus can be normally stopped without stopping the apparatus due to a jam (NO in step S609), the CPU 171 performs the same processing as the above-described recovery processing executed when the occurrence frequency of an abnormal condition is not high. More specifically, the CPU 171 notifies the user on the operation unit 172 of information representing that the apparatus has stopped because the abnormal condition is detected, as represented by the screen 1703 in FIG. 17C (step S612). Then, the user is prompted to input continuation of the job.

If the processing continuation (job continuation) input by the user is accepted (YES in step S614), the CPU 171 makes preparations to internally continue the processing (job), and continues the processing (job) (step S616). In this fashion, the user can recover the apparatus to a normal condition without notifying him of trouble information on the operation unit 172. After that, the trouble detection ends.

(3) Case in which Function Counter is Used to Determine Abnormality Occurrence Frequency In cases (1) and (2) described above, the total sheet count counter 176 in image formation is used to determine the occurrence frequency of an abnormal condition in order to determine a trouble upon occurrence of an abnormality. In contrast, an example in which the occurrence frequency of an abnormality is determined not by the total sheet count counter 176 but by another method (function counter 181) will be described. To explain determination of the occurrence frequency of an abnormality by the function counter 181, detection of an abnormal condition in the developing units 4a to 4d will be exemplified.

Figures 10, 11:
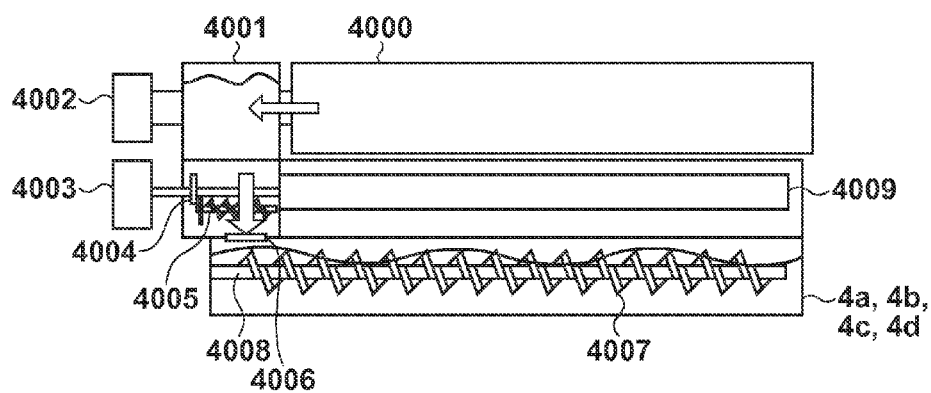
FIG. 10 is a schematic view showing a section when viewed from the side surface of a developing unit.
FIG. 11 is a view for explaining an output example of color image formation and monochrome image formation.

FIG. 10 is a schematic view showing a section when viewed from the side surface of one of the developing units 4a to 4d in the embodiment. An operation until toner is supplied from a toner container 4000 to an inside 4007 of the developing unit will be explained with reference to FIG. 10. An arrow in FIG. 10 indicates a direction in which toner moves from the toner container 4000 to the inside 4007 of the developing unit. A toner container driving motor 4002 rotates to supply the toner from the toner container 4000 to a toner hopper 4001. A toner amount sensor (not shown) in the toner hopper 4001 detects that the amount of toner in the toner hopper 4001 becomes smaller than a predetermined amount. Based on this, the toner is supplied from the toner container 4000 to the toner hopper 4001 until the amount of toner in the toner hopper 4001 recovers to the predetermined amount. A developing motor 4003 rotates a developing cylinder 4009 for applying toner from one of the developing units 4a to 4d to a drum (not shown) at high voltage for development, and a toner stirring screw 4008 for stirring the toner in the inside 4007 of the developing unit.

A toner supply clutch 4004 operates/stops a toner supply screw 4005 in accordance with the ON/OFF operation of the clutch mechanism by using the developing motor 4003 as a driving source. In response to this, toner is supplied from the toner hopper 4001 to the inside 4007 of the developing unit via a toner supply port 4006. Further, a density sensor (not shown) controls and adjusts the toner supply amount so that the toner density always becomes stable by stabilizing the ratio of toner and carrier in the inside 4007 of the developing unit at a predetermined ratio. The developing motor 4003 rotates basically during the development period in image formation. During this period, the toner supply screw 4005 is driven to supply toner from the toner hopper 4001 by an amount necessary for image formation.

In this case, a trouble of the toner supply screw 4005 of one of the developing units 4a to 4d, or a trouble of the developing motor 4003 serving as the driving source of the toner stirring screw 4008 is detected. The developing motor 4003 described here assumes DC brushless motor driving described with reference to FIGS. 5A and 5B. A trouble is detected by detecting that the Lock signal changes to the Low state during rotation and the motor stops.

Various rotation abnormality causes are assumed. Examples are a motor driving wiring failure and disconnection, and an electrical factor such as abnormal detection of the Lock signal owing to electrical noise. In addition, the toner supply amount to the inside 4007 of the developing unit becomes abnormal upon the abnormal condition of an electrical or mechanical operation of a related component, and a full amount of developing agent containing toner and carrier applies a physical load to rotation of the toner stirring screw 4008. As a result, the toner stirring screw 4008 fails to rotate owing to an insufficient torque.

Because of developing units for a full-color image forming apparatus, there are Y (Yellow), M (Magenta), C (Cyan), and Bk (BlacK) developing units, and troubles need to be detected for the respective colors.

Assume that the occurrence frequency of an abnormal condition is determined using the total sheet count counter 176, as in cases (1) and (2). As an example of use by the user, assume that monochrome images are printed out by an excessively large amount, and color images are printed out by an excessively small amount. In this case, color images are hardly printed out, and the occurrence interval of abnormal condition detection for development and functions executed only in color printing tends to be large. Even if a target component is actually damaged, it is determined that the occurrence frequency of the abnormal condition remains low for a long time in determination of an abnormal condition based on the total sheet count counter 176. It may not be notified that the target component is damaged. This may also apply to the detection of the abnormal condition of the developing motor 4003 if the occurrence frequency of the abnormal condition is determined based on the total sheet count counter 176.

To prevent this, in the detection of the abnormal condition of the developing motor 4003, the use of the developing motor of each color is regarded as one function. Every time toner supply is executed once in the developing unit of each color, the use count of the developing motor is incremented by one. Then, the function counter 181 stores and manages the incremented use count counter for the developing motor of each color.

A printout example of color images/monochrome images as in FIG. 11 is assumed. FIG. 11 shows a use example in which monochrome image data output: 1000 sheets→color image output: 1 sheet→monochrome image data output: 2500 sheets→color image output: 1 sheet→monochrome image data output: 2500 sheets sequentially from the left. In the second color image output from the left, assume that the M (Magenta) developing motor 4003 has been damaged and actually gone wrong, and the abnormal condition has been detected once. A comparison threshold counter value for the function counter to determine damage to the M (Magenta) developing motor 4003 is provided as shown in FIG. 14. In this case, assume that a threshold counter value of 1,000 is set in advance.

In the fourth color image output from the left for the next color image, an abnormal condition occurs again in the M (Magenta) developing motor 4003 because the M (Magenta) developing motor 4003 has actually gone wrong. Determination based on the function counter value indicates the second occurrence of the abnormal condition, and it is determined that the function counter value is smaller than the threshold counter value of 1,000. As a result, the occurrence frequency of the abnormal condition is determined to be high. That is, it is determined that the M (Magenta) developing motor 4003 has gone wrong, and the operation unit is notified of the trouble information.

In this way, every time the developing motor of each color operates, the function counter is independently incremented. When the developing motor of each color stands still, the function counter is not updated. Hence, the accurate use situation of each developing motor can be obtained, and at the same time, the precision of the occurrence frequency of an abnormal condition increases, compared to a case in which the occurrence frequency of the abnormal condition is determined based on the total sheet count counter 176 in image formation, as in cases (1) and (2) described above.

Figure 12B:
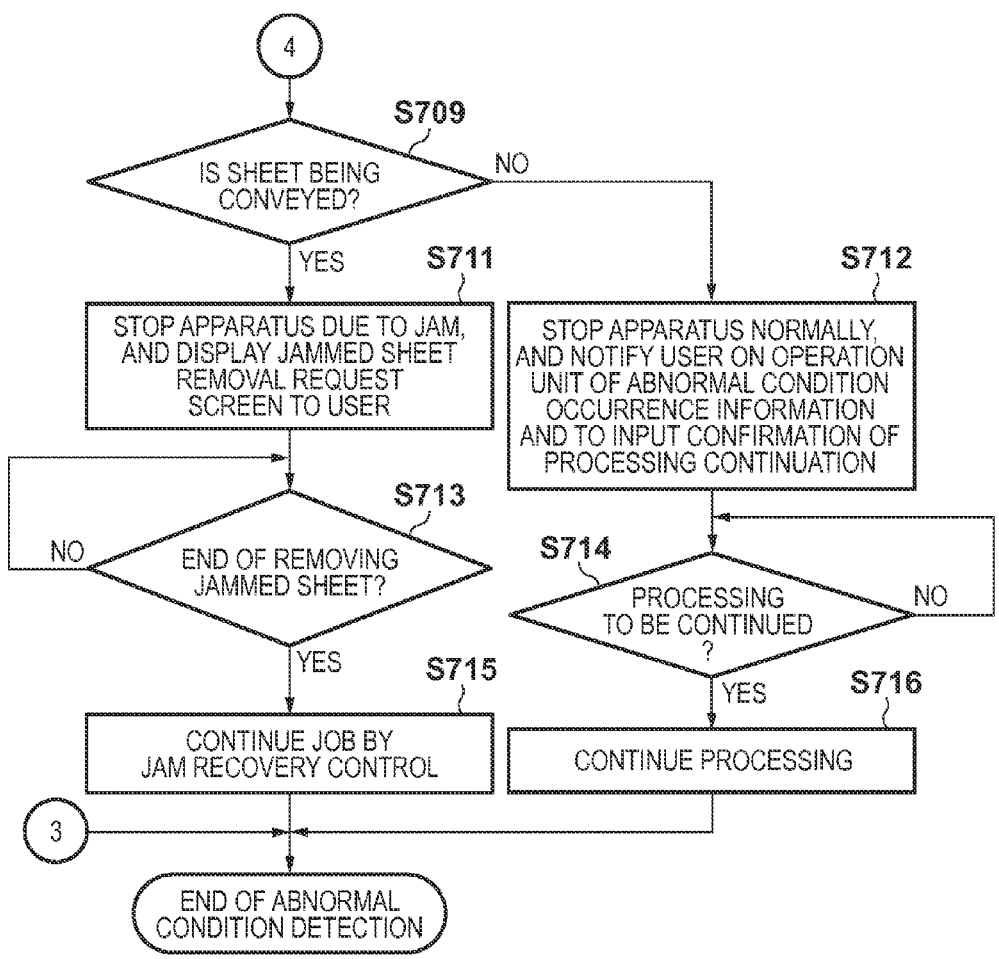

FIGS. 12A and 12B are flowcharts in which processing using the total sheet count counter 176 in the flowcharts of FIGS. 6A and 6B described in cases (1) and (2) is replaced with processing using the function counter 181 (in this case, the use count counter for the developing motor of each color). When the abnormal condition of the developing motor 4003 is detected, the occurrence frequency of the abnormal condition is determined according to the flowcharts of FIGS. 12A and 12B based the use count counter for the developing motor of each color serving as the function counter upon occurrence of the abnormal condition. The abnormality detection history memory 180 stores abnormal condition information. Detailed control in the flowcharts of FIGS. 12A and 12B are the same as one in which the function counter 181 replaces the total sheet count counter 176 in the flowcharts of FIGS. 6A and 6B, and a detailed description thereof will not be repeated. Note that the flowcharts shown in FIGS. 12A and 12B are implemented by reading out a program stored in the ROM 174 and executing it by the CPU 171 of the image forming apparatus 101.

Determination of the occurrence frequency of an abnormal condition by the function counter is also applicable to detection of an abnormal condition during a period other than execution of a job, that is, other than an image forming operation such as during a pre-multiple rotation operation, pre-rotation operation, or post-rotation operation. For example, as for an abnormal condition detected during adjustment control of various process parameters that is executed only in a pre-multiple rotation operation, the pre-multiple rotation execution count is incremented as the function counter 181, for example, as the pre-multiple rotation execution count counter every time pre-multiple rotation is executed. Upon occurrence of an abnormal condition, the pre-multiple rotation execution count counter can be used as the function counter 181 for determining the occurrence frequency.

(4) Case in which Determination Condition is Changed for Each Abnormal Condition Detection Type in Determination of Occurrence Frequency of Abnormal Condition As described in cases (1) to (3), when the occurrence frequency of an abnormal condition is determined upon detecting the abnormal condition, determination based on the total sheet count counter 176 is sometimes optimal depending on the abnormal condition detection type. In other cases, it may be optimal to increment the component use count or function execution count as the function counter 181 independently for each function, and make a determination based on each function counter.

Considering this, a method of changing the occurrence determination condition for each abnormal condition detection type will be explained. FIGS. 13A and 13B show information stored in the abnormality detection history memory 180, similar to FIGS. 7A to 7D. The abnormality detection history memory 180 stores and manages, as a history, information about an abnormal condition which occurred in the past, including an abnormal condition detail code 1301, a total sheet count counter value 1302 upon occurrence of an abnormal condition, and a function counter value 1303 upon occurrence of an abnormal condition. Note that the abnormality detection history memory 180 does not store any information when the apparatus is new. However, even this example assumes a state in which sheets have been printed out by a certain amount, troubles have already been detected several times, and the abnormality detection history memory 180 stores information about the abnormal conditions. In this state, assume that the user executes a job.

In the example of FIGS. 7A to 7D, the occurrence frequency of the abnormal condition is determined based on the total sheet count counter 176, and the abnormality detection history memory 180 stores the abnormal condition detail code 7001 and the total sheet count counter value 7002 upon occurrence of an abnormal condition. The example in FIGS. 13A and 13B is different from that in FIGS. 7A to 7D in that the determination condition of the occurrence frequency of the abnormal condition is changed for each detected type of abnormal condition. When occurrence of an abnormal condition is detected, either the total sheet count counter value 1302 or function counter value 1303 upon occurrence of the abnormal condition is stored depending on the type of abnormal condition, as information to be stored together with the abnormal condition detail code 1301 upon occurrence of the abnormal condition.

Similar to FIG. 8, FIG. 14 shows information used to, when an abnormal condition is detected, determine whether the occurrence frequency of the abnormal condition is high, by comparing information about the abnormal condition that has occurred this time and information about abnormal conditions that occurred in the past, which is stored in the abnormality detection history memory 180. In this case, the information includes a detail code 1401 of an abnormal condition which occurred, and abnormal condition occurrence frequency determination threshold counter values 1402 and 1403 decided in advance by measurement or the like.

The example in FIG. 14 is different from the example in FIG. 8 in that information of either the total sheet count counter or function counter to be compared is selected and determined for each abnormal condition type. Information of a threshold counter value to be compared is stored in the storage area of the target counter, and "0" is stored in the storage area of the non-target counter. Every time an abnormal condition occurs and is detected, either the total sheet count counter or function counter is selected based on the information in FIG. 14.

Figure 16A:
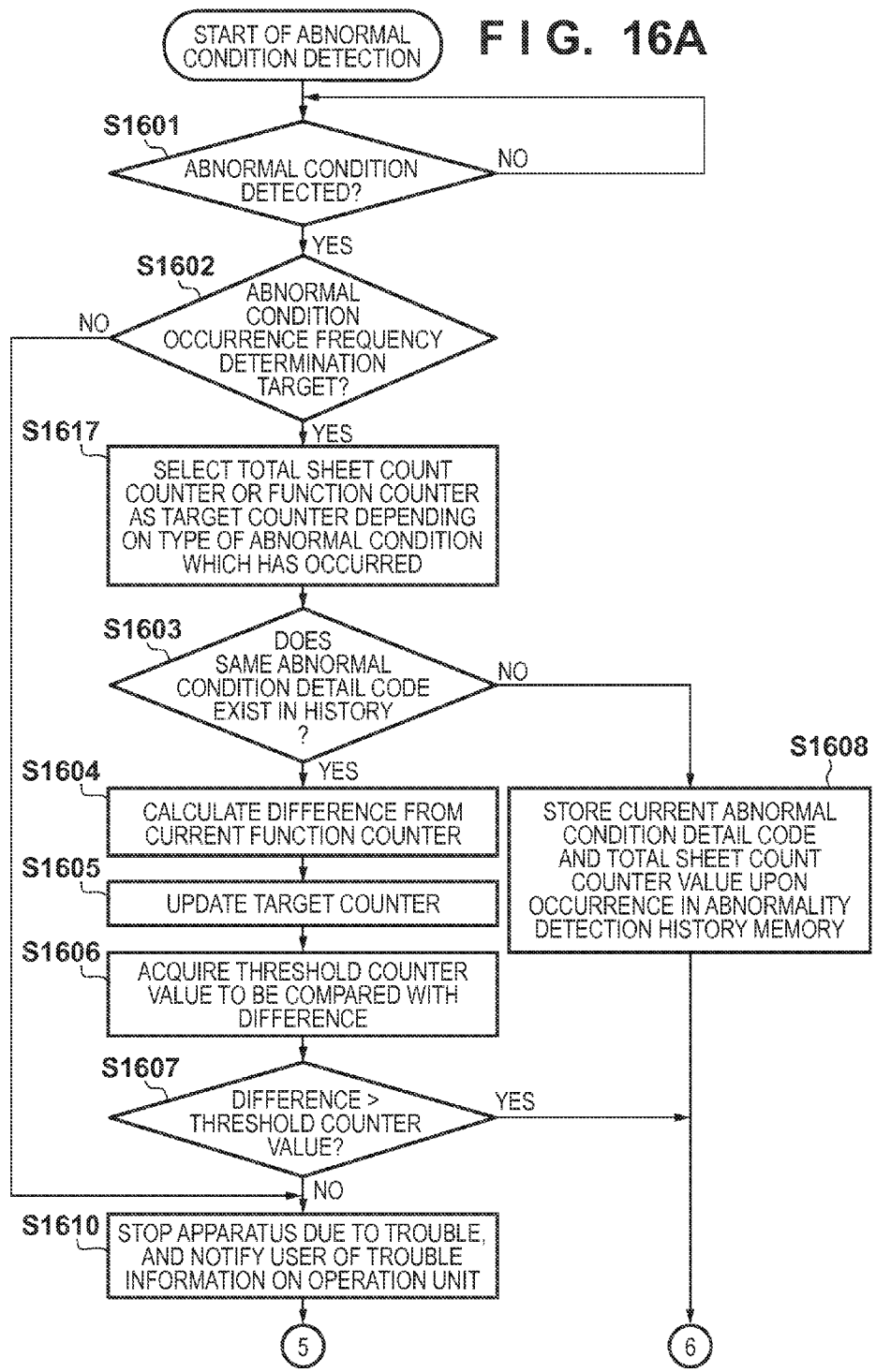
FIGS. 16A and 16B are flowcharts in the image forming apparatus.
Figure 16B:
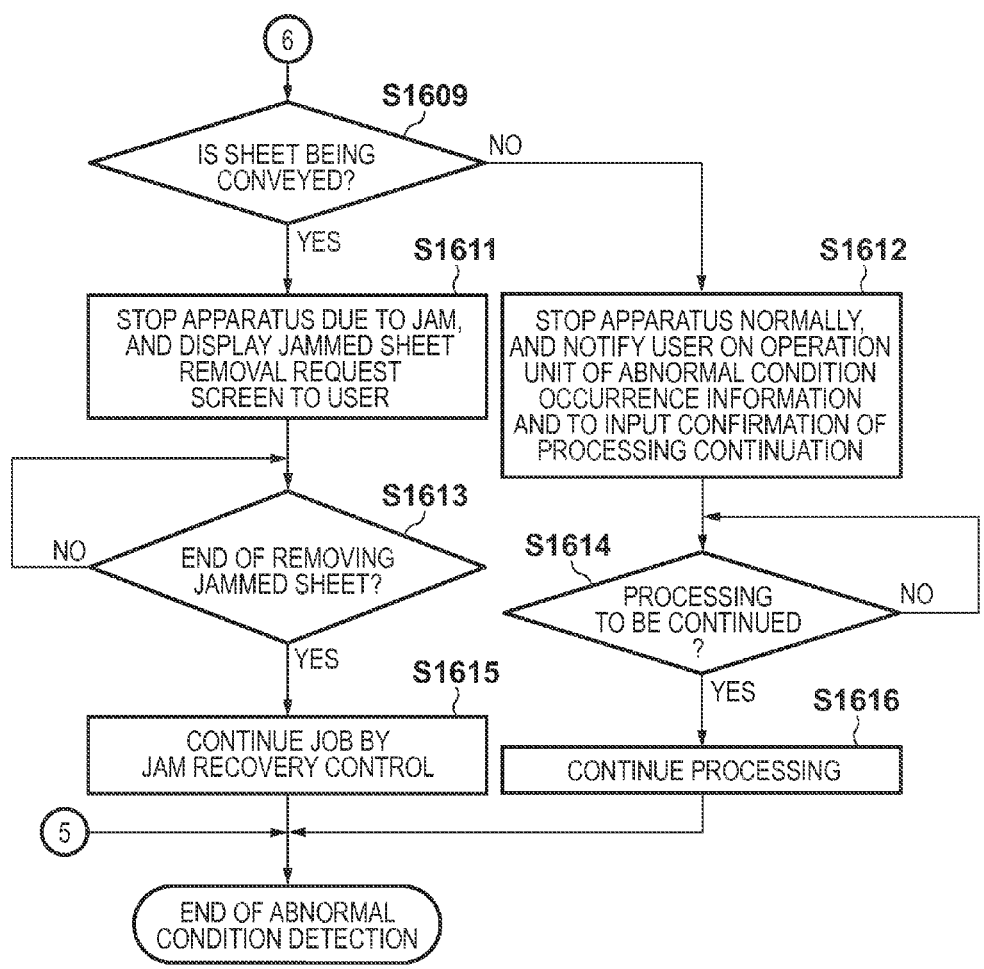

Processing will be explained with reference to the flowcharts of FIGS. 16A and 16B. This example will explain an operation when an abnormal condition detail code 1501 is "00220011" and a function counter value 1503 upon occurrence of the abnormality is "0006328", as shown in FIG. 15. Note that total sheet count counter value 1502 is set to "00000000" and is not used. Note that the flowcharts shown in FIGS. 16A and 16B are implemented by reading out a program stored in the ROM 174 and executing it by the CPU 171 of the image forming apparatus 101.

The user designates job output, and the CPU 171 starts detecting various abnormal conditions. The CPU 171 monitors whether various abnormal conditions have occurred (step S1601). If an abnormal condition has occurred, the CPU 171 determines whether the abnormal condition is an occurrence frequency determination target (step S1602). As for an abnormal condition in the fixing unit or the like, if the fixing unit or the like is actually damaged, the user cannot recover it to a normal condition. Thus, such an abnormal condition is not an abnormal condition occurrence frequency determination target (NO in step S1602), and the CPU 171 stops the apparatus due to the trouble. The CPU 171 quickly displays the screen 1701 on the operation unit 172, and notifies the user of the abnormal condition (step S1610). Then, the abnormal condition detection ends.

In this example, assume that the abnormal condition detail code D "00220011" in FIG. 15 indicates detection of an abnormal condition for which the occurrence frequency of the abnormal condition is determined. In this case, to select the criterion of frequency determination upon detection of the abnormal condition in FIG. 15, the information shown in FIG. 14 is searched for the abnormal condition detail code in FIG. 15. More specifically, the total sheet count counter or function counter is selected as the determination condition of the occurrence frequency of the abnormal condition based on the abnormal condition detail code 1501 ("00220011" in this case) in FIG. 15.

Which of the total sheet count counter and function counter is selected is determined in advance for each abnormal condition type. The information is stored as a program in the ROM area or RAM area. If the information is stored in the RAM area, the numerical value of the counter can also be rewritten from the operation unit 172. If the threshold can be rewritten on the operation unit 172, it can be individually set even in a case in which the occurrence situation of an abnormal condition actually changes depending on the use environment of a user in the market.

In the embodiment, which of the total sheet count counter and function counter is selected is determined based on whether the counter value of information stored in FIG. 14 is "0". In this case, information (counter) which holds a nonzero numerical value is employed. For the abnormal condition ("00220011") in this example, the occurrence frequency determination threshold counter value 1402 for the total sheet count counter is "0" by referring to the abnormal condition detail code "0022" in the information of FIG. 14. Thus, the CPU 171 selects the function counter as the determination condition of the occurrence frequency of the abnormal condition (step S1617).

The CPU 171 determines whether the same abnormal condition as that which has occurred this time exists in the abnormal condition detail code 1301 upon occurrence of past abnormal conditions in FIG. 13A that is stored in the abnormality detection history memory 180 (step S1603). In this example, the same abnormal condition as the current abnormal condition ("00220011") exists at the fifth address ("00000005") in FIG. 13A (YES in step S1603). Thus, the CPU 171 calculates the difference between the current function count and the count value held in the abnormality detection history memory 180 (step S1604). The CPU 171 updates the function counter value in the abnormality detection history memory 180 (step S1605), as shown in FIG. 13B. At this time, the function counter value is updated to "00006328" as represented by the function counter value 1503 shown in FIG. 15.

Thereafter, the CPU 171 acquires, from the information in FIG. 14, the abnormal condition occurrence frequency determination threshold counter value for the function counter of the abnormal condition ("00220011") in this example (step S1606). The CPU 171 compares the difference obtained by calculation and the acquired threshold counter value (step S1607). If the difference is equal to or smaller than the threshold counter value (NO in step S1607), the occurrence frequency of the abnormal condition is high. The CPU 171 determines that the apparatus is highly likely to go wrong, and stops the apparatus due to the trouble. The CPU 171 notifies the user of the trouble information on the operation unit 172, as represented by the screen 1701 in FIG. 17A (step S1610). Then, the abnormal condition detection ends.

When notified of the trouble information on the operation unit 172, the user recognizes the trouble in the apparatus, and calls out a serviceman for a repair request.

If the trouble code of the abnormal condition which has occurred this time does not exist in the abnormality detection history memory 180 in step S1603 (NO in step S1603), the CPU 171 stores, in the area of the abnormality detection history memory 180, information about the abnormal condition which has occurred this time (step S1608).

If the difference is larger than the threshold counter value (YES in step S1607), the CPU 171 determines that the occurrence frequency of the abnormal condition is not high. The CPU 171 then determines whether a sheet is being conveyed in the apparatus (step S1609). If a sheet is being conveyed (YES in step S1609), the CPU 171 handles this situation as a jam, and stops the apparatus. The CPU 171 notifies the user of jam occurrence information on the operation unit 172, as represented by the screen 1702 in FIG. 17B (step S1611). Then, the user recognizes the information and is prompted to remove the jammed sheet.

If it is detected that the user has removed the jammed sheet (YES in step S1613), the CPU 171 makes preparations to internally continue the job, and continues the job by jam recovery processing (step S1615). After that, the processing sequence ends.

If the sheet during conveyance can be normally discharged and the apparatus can be normally stopped without stopping the apparatus due to a jam (NO in step S1609), the CPU 171 notifies the user on the operation unit 172 of information representing that the apparatus has stopped because the abnormal condition is detected, as represented by the screen 1703 in FIG. 17C (step S1612). Then, the user is prompted to input continuation of the job. If the processing continuation (job continuation) input by the user is accepted (YES in step S1614), the CPU 171 makes preparations to internally continue the processing (job), and continues the processing (job) (step S1616).

Accordingly, the user can recover the apparatus to a normal condition without notifying him of trouble information on the operation unit 172. Then, the abnormal condition detection ends.

In this example, the difference is

00006328−0005212=00001116(times)

In FIG. 14, the threshold counter value to be compared is "00001500". Comparing the difference and threshold counter value yields

00001500>00001116

Since the difference is equal to or smaller than the threshold, the CPU 171 determines that the occurrence frequency of the abnormal condition is high (NO in step S1607), and notifies the user of the abnormal condition detail code "0022-0011" as trouble information on the operation unit 172. After notified of the trouble, the user makes a call-out request to a serviceman.

(5) Case in which Condition is Added and Occurrence Frequency of Trouble is Determined Upon Occurrence of Same Trouble In cases (1) to (4) described above, upon occurrence of an abnormal condition, information about the abnormal condition is stored in the abnormality detection history memory 180, and the occurrence frequency of the abnormal condition is determined by searching, comparing, and investigating the abnormal condition which has occurred this time, and abnormal conditions which occurred previously. Here, a case in which a condition is further added to information about an abnormal condition and the occurrence frequency of the abnormal condition is determined will be explained.

In the above-mentioned cases, an abnormal condition detail code is assigned to each abnormal condition which occurs in the apparatus. At this time, when even abnormal conditions corresponding to the same abnormal condition detail code are classified in more detail, a control parameter which greatly affects the occurrence frequency of the abnormal condition may exist.

For example, in the example of the developing motor 4003, assume that process speeds in image formation such as full-speed rotation and half-speed rotation affect the rotational load of the developing motor 4003, and the use of half-speed rotation has a great influence. In this case, process speed information apparently affects occurrence of an abnormal condition. Hence, process speed information is added upon occurrence of an abnormal condition and stored in the abnormality detection history memory 180, as shown in FIG. 18. When determining the occurrence frequency of an abnormal condition, it needs to be considered whether the abnormal condition has occurred in half-speed rotation.

In FIG. 18, "0" represents full speed, and "1" represents half speed. The threshold counter value to determine the occurrence frequency of the abnormal condition needs to be changed and considered between a case in which the abnormal condition has occurred during rotation at half process speed and a case in which it has occurred during rotation at full process speed. For example, when an abnormal condition occurred in half-speed rotation previously or this time, comparison is performed using ⅔ of a threshold counter value acquired from the information shown in FIG. 14. The trouble can be easily determined in consideration of the influence of the rotational load of the developing motor 4003 controlled at half process speed.

Using control parameter information upon occurrence of an abnormal condition can further increase the determination precision of the occurrence frequency upon occurrence of the abnormal condition. Note that the parameter for each abnormal condition is not limited to the rotational speed, and another parameter upon occurrence of an abnormal condition may be used. A method of reflecting a control parameter in a threshold counter value is not limited to the above-described method. For example, another fixed value may be used.

By performing the processes in cases (1) to (5), according to the present invention, a trouble state which may frequently occur in an image forming apparatus in an unstable state in which a component is actually damaged or being damaged is reliably detected, and the user is notified of error information. As for a trouble which intermittently occurs due to a detection error in a damage-free state, the user can recover the image forming apparatus to a normal condition.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-284461, filed Dec. 26, 2011, which is hereby incorporated by reference herein in its entirety.

What is claimed is:

1. An image forming apparatus which detects an abnormal state of the image forming apparatus and notifies a user of the abnormal state, comprising:

an image forming unit constructed to form an image;
a counter constructed to count a cumulative number of sheets on which an image is formed by the image forming unit;
a detection unit constructed to detect the abnormal state of the image forming apparatus;
a storage unit constructed to store history information including information about a type of the abnormal state and a cumulative number of sheets at the timing of detecting the abnormal state in a case where said detection unit detects the abnormal state;
a notification unit constructed to perform a notification about the abnormal state; and
a control unit constructed,
in a case where a type of an abnormal state which has newly occurred is a first type, if a difference between a cumulative number of sheets at the timing of detecting the abnormal state which has newly occurred and a cumulative number of sheets at the previous timing of detecting the same abnormal state as the abnormal state which has newly occurred is larger than a predetermined value, to make the notification unit notify information about removal for the abnormal state which has newly occurred, and, if the difference is not larger than the predetermined value, to make the notification unit notify that a repair request for the image forming apparatus is needed, and in a case where a type of an abnormal state which has newly occurred is a second type, to make the notification unit notify, regardless of the difference between a cumulative number of sheets at the timing of detecting the abnormal state which has newly occurred and a cumulative number of sheets at the previous timing of detecting the same abnormal state as the abnormal state which has newly occurred, that a repair request for the image forming apparatus is needed.

2. The apparatus according to claim 1, wherein said storage unit updates the cumulative number of sheets at the previous timing of detecting the same abnormal state as the abnormal state which has newly occurred with the cumulative number of sheets at the timing of detecting the abnormal state which has newly occurred.

3. The apparatus according to claim 1, wherein if the difference between a cumulative number of sheets at the timing of detecting the abnormal state and a cumulative number of sheets at the previous timing of detecting the same abnormal state as the abnormal state which has newly occurred is larger than the predetermined value and a sheet is being conveyed at the timing of detecting the abnormal state which has newly occurred, said control unit handles as a jam of the sheet and stops image forming processing.

4. The apparatus according to claim 1, wherein if the difference between a cumulative number of sheets at the timing of detecting the abnormal state and a cumulative number of sheets at the previous timing of detecting the same abnormal state as the abnormal state which has newly occurred is larger than the predetermined value and a sheet is discharged from the image forming apparatus after detecting the abnormal state which has newly occurred, said control unit determines an input of an instruction for continuing image forming processing.

5. A method of controlling an image forming apparatus which detects an abnormal state of the image forming apparatus, comprising:

detecting the abnormal state of the image forming apparatus;

storing history information including information about a type of the abnormal state and a cumulative number of sheets at the timing of detecting the abnormal state in a case where the abnormal state is detected in the detecting step;

in a case where a type of an abnormal state which has newly occurred is a first type, if a difference between a cumulative number of sheets at the timing of detecting the abnormal state and a cumulative number of sheets at the previous timing of detecting the same abnormal state as the abnormal state which has newly occurred is larger than a predetermined value, making the notification unit notify information about removal for the abnormal state which has newly occurred, and if the difference is not larger than the predetermined value making the notification unit notify that a repair request for the image forming apparatus is needed; and in a case where a type of an abnormal state which has newly occurred is a second type, making the notification unit notify, regardless of the difference between a cumulative number of sheets at the timing of detecting the abnormal state which has newly occurred and a cumulative number of sheets at the previous timing of detecting the same abnormal state as the abnormal state which has newly occurred an occurrence, that a repair request for the image forming apparatus is needed.

\* \* \* \* \*